US012762073B2

(12) United States Patent
Seita et al.

(10) Patent No.: US 12,762,073 B2
(45) Date of Patent: Oct. 13, 2026

(54) MESSAGE DISTRIBUTION SYSTEM AND METHOD

(71) Applicant: Hitachi, Ltd., Tokyo (JP)

(72) Inventors: Yasuyuki Seita, Tokyo (JP); Shinichiro Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 48 days.

(21) Appl. No.: 19/066,912

(22) Filed: Feb. 28, 2025

(65) Prior Publication Data

US 2026/0079866 A1 Mar. 19, 2026

(30) Foreign Application Priority Data

Sep. 18, 2024 (JP) ................................ 2024-160994

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................. G06F 13/20; G06F 2213/40
See application file for complete search history.

(56) References Cited

U.S. PATENT DOCUMENTS

| | | | | |
|---|---|---|---|---|
| 10,108,707 | B1 * | 10/2018 | Chu | G10L 15/26 |
| 2008/0031243 | A1 * | 2/2008 | Gershinsky | H04L 12/1859 370/465 |
| 2011/0179020 | A1 * | 7/2011 | Ozzie | G06F 16/958 707/723 |
| 2015/0245094 | A1 * | 8/2015 | Schneider | H04N 21/64322 725/34 |
| 2020/0301973 | A1 * | 9/2020 | Sewani | G06F 16/9035 |
| 2022/0052972 | A1 * | 2/2022 | Chang | H04L 51/212 |
| 2022/0284320 | A1 * | 9/2022 | Yan | G06N 5/04 |

FOREIGN PATENT DOCUMENTS

| | | |
|---|---|---|
| JP | 2015-125639 A | 7/2015 |

* cited by examiner

*Primary Examiner* — Henry Tsai
*Assistant Examiner* — Harry Z Wang
(74) *Attorney, Agent, or Firm* — Volpe Koenig

(57) ABSTRACT

There is proposed a message distribution system and method that can reduce an increase in management cost of session management due to an increase in the number of subscriptions to topics in a message receiving side. The message distribution system that distributes messages using a Pub/Sub model is provided with a topic editor apparatus, and when the number of subscriptions to topics is equal to or larger than a first threshold, a receiving apparatus transmits the integration request of the topics to the topic editor apparatus, the topic editor apparatus instructs a relay apparatus to generate an integrated topic into which topics requested to be integrated by the received integration request are integrated, and starts the subscription to the topics to transmit the messages to the relay apparatus, and the relay apparatus distribute the messages on the integrated topic to the receiving apparatus that subscribes to the integrated topic.

14 Claims, 23 Drawing Sheets

SUBSCRIPTION CONDITION LIST 45

FIG. 10(A)

| SUBSCRIBER NAME | SUBSCRIPTION TOPIC NAME | SUBSCRIPTION FLAG |
|---|---|---|
| Subscriber 1 | Topic 1 | 1 |
| Subscriber 2 | Topic 2 | 1 |
| Subscriber 3 | Topic 3 | 1 |
| 45A | 45B | 45C |

SUBSCRIPTION CONDITION LIST 45
(AFTER RECEIVING INTEGRATION COMPLETION NOTIFICATION)

FIG. 10(B)

| SUBSCRIBER NAME | SUBSCRIPTION TOPIC NAME | SUBSCRIPTION FLAG |
|---|---|---|
| Subscriber 1 | Topic 1 | 0 |
| Subscriber 2 | Topic 2 | 0 |
| Subscriber 3 | Topic 3 | 0 |
| Subscriber 4 | Topic 5 | 1 |
| 45A | 45B | 45C |

FIG. 11

REFERENCE TOPIC LIST 46

| No | SUBSCRIPTION TOPIC NAME |
|---|---|
| 1 | Topic 1 |
| 2 | Topic 2 |
| 3 | Topic 3 |
| 46A | 46B |

FIG. 12

INTEGRATION REQUEST LIST 49

| INTEGRATION REQUEST TOPIC | REQUESTOR'S MANAGER NAME | NUMBER OF REQUESTS |
|---|---|---|
| Topic1,Topic2, Topic3 | Manager1,Manager4 | 2 |
| Topic1,Topic2, Topic4 | Manager2 | 1 |
| 49A | 49B | 49C |

FIG. 13

INTEGRATION CONDITION LIST 50

| INTEGRATION REQUEST TOPIC | REQUESTOR'S MANAGER NAME | POST-INTEGRATION TOPIC NAME | NUMBER OF REQUESTS |
|---|---|---|---|
| Topic1,Topic2, Topic3 | Manager1,Manager4 | Topic5 | 2 |
| 50A | 50B | 50C | 50D |

FIG. 14

CHANGE SCHEDULE LIST 51

| INTEGRATION REQUEST TOPIC | REQUESTOR'S MANAGER NAME | NUMBER OF REQUESTS |
|---|---|---|
| Topic1,Topic2, Topic3 | Manager1 | 1 |
| 51A | 51B | 51C |

MESSAGE DISTRIBUTION SYSTEM AND METHOD

BACKGROUND OF THE INVENTION

Field of the Invention

The present invention relates to a message distribution system and method, and, for example, can be suitably applied to a message distribution system applying a Pub/Sub model.

Description of the Related Art

Conventional message distribution models for improving the flexibility and efficiency of a messaging system include a Pub/Sub model. In the Pub/Sub model, one or more message sending units called publishers provided on a message distributor side transmit messages to a relay system. In the relay system, these messages are classified and managed for each category called a topic.

On a message receiver side, message receiving units called subscribers are provided, the subscribers being associated with respective topics to which a message receiver wishes to subscribe. For example, each of the subscribers periodically accesses the relay system and acquires messages on the topic associated with the subscriber itself (in a case of a PULL type).

According to such a Pub/Sub model, the publishers and the subscribers can be independently scaled and can be individually and easily added and deleted, and can further transmit and receive messages in a state in which the message distributor is asynchronous with the message receiver, and therefore, there is an advantage in that the throughput of the entire system can be improved.

Note that Patent Literature 1 discloses a technique for redistributing, using the Pub/Sub type communication, secondary data obtained by processing the data distributed through the Pub/Sub type communication, in association with the Pub/Sub model.

CITATION LIST

Patent Literature

Patent Literature 1: JP 2015-125639

However, in the message distribution system that employs the Pub/Sub model, when the number of subscriptions to topics is increased on the message receiving side, the number of sessions between the relay system and the message receiving side also increases, which leads to an increase in management cost of the session management on the message receiving side.

The present invention has been made in view of the above points, and an object thereof is to propose a message distribution system and method that can reduce an increase in management cost of session management due to an increase in the number of subscriptions to topics in a message receiving side.

SUMMARY OF THE INVENTION

In order to solve such a problem, the present invention provides a message distribution system that individually manages messages transmitted from a sending apparatus for each of topics in a relay apparatus and distributes the messages on the topics subscribed to by a receiving apparatus from the relay apparatus to the receiving apparatus, the message distribution system being provided with a topic editor apparatus that manages the topics, in which the receiving apparatus transmits, to the topic editor apparatus, an integration request that requests to integrate the topics subscribed to by the receiving apparatus itself when the number of the topics subscribed to by the receiving apparatus itself is equal to or larger than a predetermined first threshold, the topic editor apparatus instructs the relay apparatus to integrate the topics requested to be integrated by the received integration request, starts subscription to the topics requested to be integrated by the integration request, and transmits the received messages to the relay apparatus, while instructing the receiving apparatus that has transmitted the integration request to subscribe to an integrated topic into which the topics requested to be integrated by the integration request are integrated, and the relay apparatus generates the integrated topic into which the specified topics are integrated according to an instruction from the topic editor apparatus, manages the messages on the topics constituting the integrated topic as messages on the integrated topic, and distributes the messages on the integrated topic to the receiving apparatus that subscribes to the integrated topic.

The present invention provides a message distribution method executed by a message distribution system that individually manages messages transmitted from a sending apparatus for each of topics in a relay apparatus and distributes the messages on the topics subscribed to by a receiving apparatus from the relay apparatus to the receiving apparatus, the message distribution system including a topic editor apparatus that manages the topics, the method including a first step in which the receiving apparatus transmits, to the topic editor apparatus, an integration request that requests to integrate the topics subscribed to by the receiving apparatus itself when the number of the topics subscribed to by the receiving apparatus itself is equal to or larger than a predetermined first threshold, a second step in which the topic editor apparatus instructs the relay apparatus to integrate the topics requested to be integrated by the received integration request, starts subscription to the topics requested to be integrated by the integration request, and transmits the received messages to the relay apparatus, while instructing the receiving apparatus that has transmitted the integration request to subscribe to an integrated topic into which the topics requested to be integrated by the integration request are integrated, and a third step in which the relay apparatus generates the integrated topic into which the specified topics are integrated according to an instruction from the topic editor apparatus, manages the messages on the topics constituting the integrated topic as messages on the integrated topic, and distributes the messages on the integrated topic to the receiving apparatus that subscribes to the integrated topic.

According to a message distribution system and method of the present invention, since topics are integrated into one integrated topic when the number of subscriptions to the topics in the receiving apparatus is equal to or larger than a first threshold, the number of sessions between the relay apparatus and the receiving apparatus can be prevented from being equal to or larger than a first threshold.

According to the present invention, it is possible to achieve a message distribution system and method that can reduce an increase in management cost of session management due to an increase in the number of subscriptions to topics in a message receiving side.

BRIEF DESCRIPTION OF THE DRAWINGS

FIG. 10(A) and 10(B) each are a table illustrating a configuration example of a subscription condition list;

FIG. 11 is a table illustrating a configuration example of a reference topic list;

FIG. 12 is a table illustrating a configuration example of an integration request list;

FIG. 13 is a table illustrating a configuration example of an integration condition list;

FIG. 14 is a table illustrating a configuration example of a change schedule list;

DETAILED DESCRIPTION OF THE INVENTION

Hereinafter, an embodiment of the present invention will be described in detail with reference to the drawings.

Figure 1:
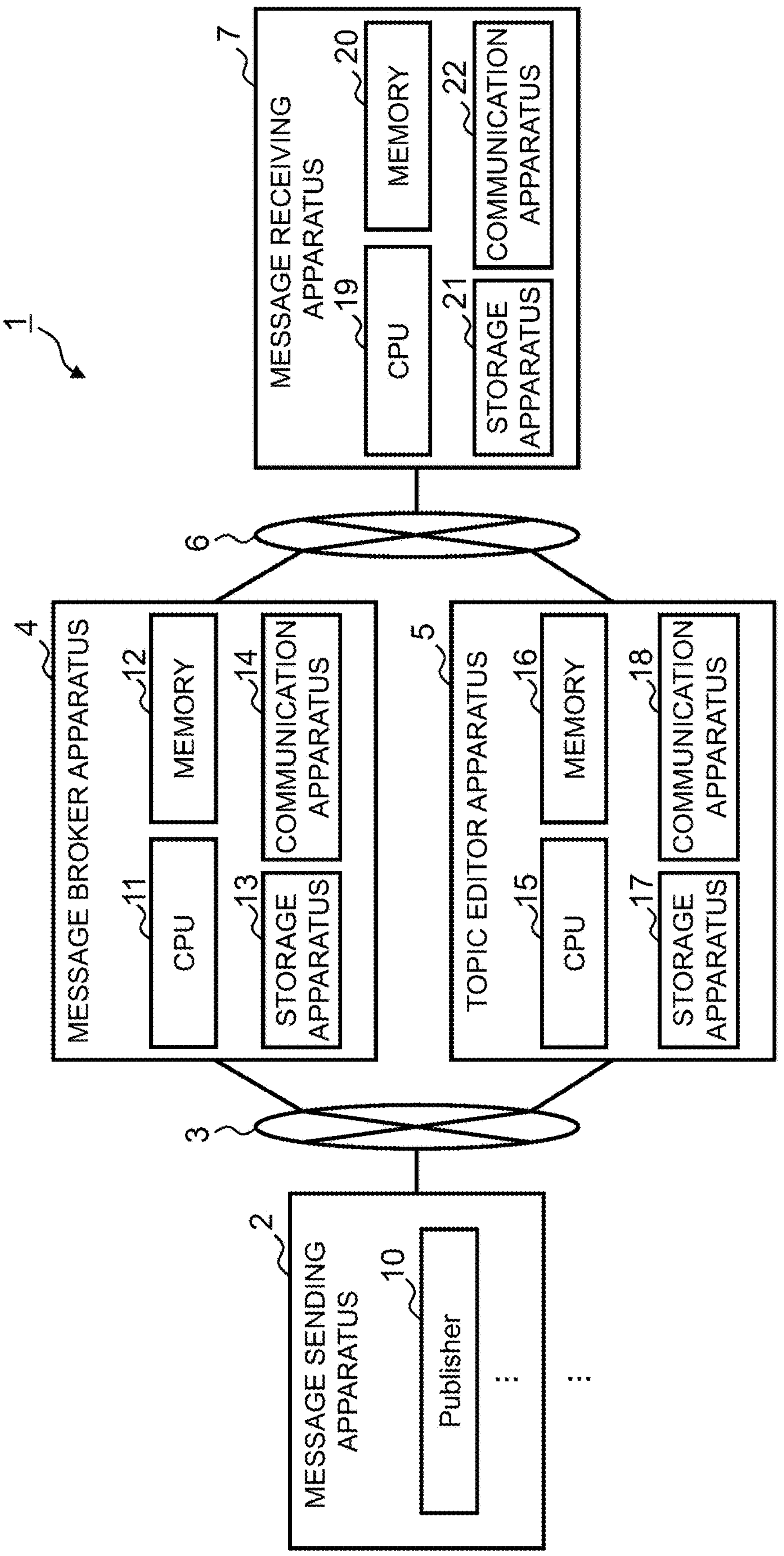
FIG. 1 is a block diagram schematically illustrating an overall configuration of a message distribution system according to the present embodiment.

(1) Configuration of Message Distribution System According to the Present Embodiment In FIG. 1, reference numeral 1 denotes, as a whole, a message distribution system of the present embodiment that employs a Pub/Sub model. The message distribution system 1 is configured by including a message broker apparatus 4 and a topic editor apparatus 5 that are mutually coupled to one or more message sending apparatuses 2 through a first network 3, and a message receiving apparatus 7 coupled to the message broker apparatus 4 and topic editor apparatus 5 through a second network 6.

The message sending apparatus 2 is a sending apparatus that transmits, for example, operation data of a manufacturing apparatus installed in a factory and operation data of a construction machine operating at a construction site as messages at a regular interval. However, the message sending apparatus 2 may transmit data or information other than the operation data.

One or more publishers 10 are installed in the message sending apparatus 2. The publisher 10 is software or hardware that has a function of transmitting a message to the message broker apparatus 4 periodically or non-periodically.

The message broker apparatus 4 is a relay apparatus that relays, between the message sending apparatus 2 and the message receiving apparatus 7, the message transmitted from the publisher 10, and includes a general-purpose server apparatus provided with an information processing apparatus such as a central processing unit (CPU) 11, a memory 12, a storage apparatus 13, and a communication apparatus 14.

The CPU 11 is a processor that controls operation of the entire message broker apparatus 4. The memory 12 includes, for example, a volatile semiconductor memory, and is used as a working memory for the CPU 11. Furthermore, the storage apparatus 13 includes a large-capacity, non-volatile storage apparatus such as a hard disk apparatus or a solid state drive (SSD), and is used to save programs and data which requires long-term storage.

Various processes of the entire message broker apparatus 4 as described later are executed as programs which are required upon the activation of the message broker apparatus 4, or whenever necessary, are loaded from the storage apparatus 13 into the memory 12 and the CPU 11 executes the programs which have been loaded into the memory 12.

The communication apparatus 14 includes, for example, a network interface card (NIC), and performs protocol control when communicating with the message sending apparatus 2 through the first network 3 and performs protocol control when communicating with the message receiving apparatus 7 through the second network 6.

On the other hand, the topic editor apparatus 5 is a computer apparatus that has a function of executing a necessary process concerning topic integration and integration cancellation, which will be described later, and includes a general-purpose server apparatus provided with an information processing apparatus such as a CPU 15, a memory 16, a storage apparatus 17, and a communication apparatus 18.

The message receiving apparatus 7 is a computer apparatus that receives a message which is transmitted from the publisher 10 of the message sending apparatus 2 and relayed by the message broker apparatus 4. As described later, an application 36 (FIGS. 3 to 8) is installed in each message receiving apparatus 7, the application 36 having various kinds of functions of analyzing operating conditions of the manufacturing apparatus or construction machine to be monitored on the basis of the received message (operation data, herein), and extracting alarm information to distribute the extracted information to a user, for example. The message receiving apparatus 7 also includes a general-purpose server apparatus provided with an information processing apparatus such as a CPU 19, a memory 20, a storage apparatus 21, and a communication apparatus 22.

The CPU 15, the memory 16, the storage apparatus 17, and the communication apparatus 18 of the topic editor apparatus 5 and the CPU 19, the memory 20, the storage apparatus 21, and the communication apparatus 22 of the message receiving apparatus 7 have functions similar to the respective functions of the CPU 11, the memory 12, the storage apparatus 13 and the communication apparatus 14 of the message broker apparatus 4, and therefore, description thereof will be omitted here.

(2) Topic Integration and Integration Cancellation Function

Next, the topic integration and integration cancellation function installed on the message distribution system 1 will be described. In this connection, a conventional message distribution system 30 to which a Pub/Sub model is applied will be described with reference to FIG. 2.

Figure 2:
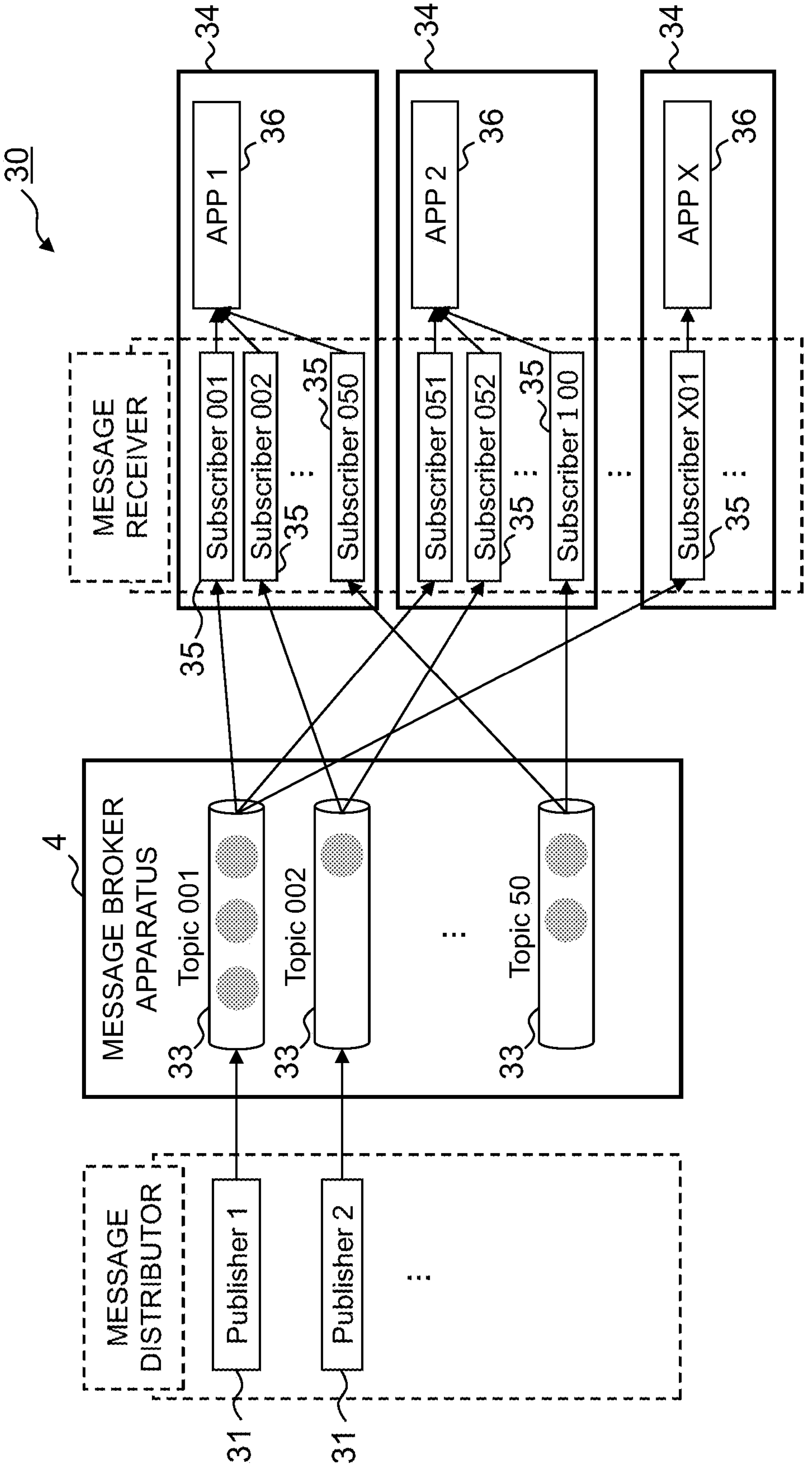
FIG. 2 is a block diagram schematically illustrating a flow of messages in a conventional message distribution system to which a Pub/Sub model is applied.

As illustrated in FIG. 2, in the conventional message distribution system 30, a message broker apparatus 4 stores a message transmitted from a publisher 31 of a message sending apparatus in a message queues 33 for a topic corresponding to the message, the message queue 33 being provided in the message broker apparatus 4 itself.

A message receiving apparatus 34 is provided with subscribers 35 in association with respective topics to which the message receiving apparatus 34 wishes to subscribe. Each subscriber 35 accesses the message broker apparatus 4 periodically or non-periodically to read a message from the message queue 33 for the topic associated with the subscriber 35 itself (in a case of PULL type), and outputs the read message to the application 36 installed on the message receiving apparatus 34.

In such a conventional message distribution system 30 to which the Pub/Sub model is applied, for example, when the number of topics to be subscribed to increases due to an increase in the number of the applications 36 installed on the message receiving apparatus 34, the number of sessions between the message broker apparatus 4 and the message receiving apparatus 34 increases, which leads to an increase in load of the message receiving apparatus 34 that manages the sessions and an increase in management cost of the sessions in the message receiving apparatus 34.

Figure 3:
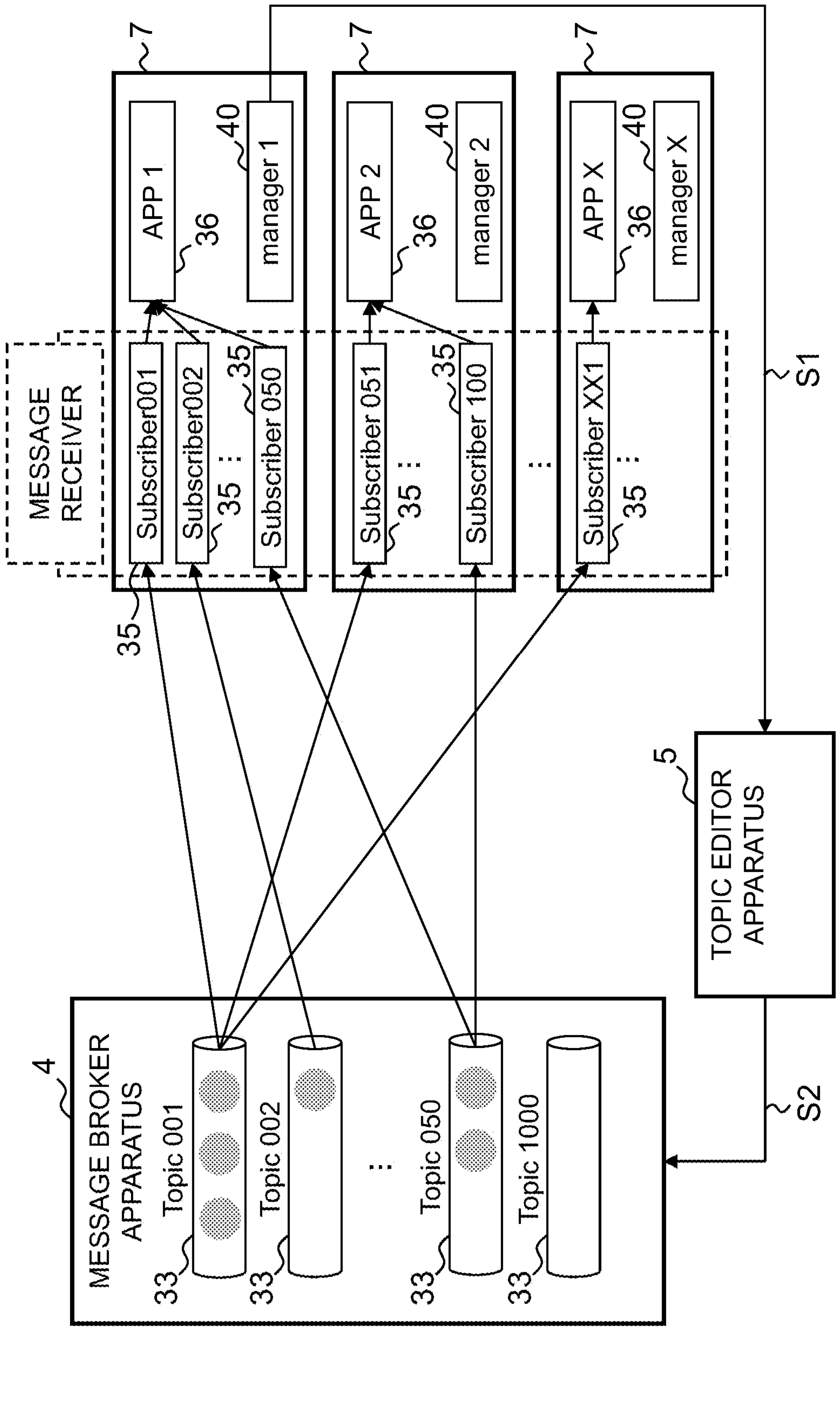
FIG. 3 is a block diagram for describing a topic integration and integration cancellation function installed on the message distribution system of the present embodiment.

Then, in the message distribution system 1 of the present embodiment, as illustrated in FIG. 3 in which the same reference numerals are assigned to portions corresponding to the respective portions in FIG. 2, a manager 40 is installed in each message receiving apparatus 7, the manager 40 monitoring the number of subscriptions to topics (hereinafter, this is referred to as a "topic subscription number") in the message receiving apparatus 7.

The manager 40 transmits, when the topic subscription number in the message receiving apparatus (hereinafter, this is referred to as the "own message receiving apparatus") 7 in which the manager 40 is installed is equal to or larger than a predetermined threshold (hereinafter, this is referred to as a "topic subscription number threshold"), a topic integration request that requests to integrate topics which the own message receiving apparatus 7 subscribes to at that time to the topic editor apparatus 5 (S1).

The topic editor apparatus 5 manages the topic integration requests that have been provided from the manager of the message receiving apparatus 7 until then, and when the number of topic integration requests having the same contents is equal to or larger than a preset threshold (hereinafter, this is referred to as an "integration request threshold"), the topic editor apparatus 5 provides an instruction to the message broker apparatus 4 to integrate the topics specified by the topic integration request (S2).

The message broker apparatus 4 that has received the instruction generates a new topic (hereinafter, this is referred to as an "integrated topic") into which the topics requested to be integrated by the topic integration request are integrated, and creates a new message queue 33 (a "Topic 1000" in FIG. 3) in association with the integrated topic. Hereinafter, the message queue 33 created in this manner is to be referred to as a message queue 33 for an integrated topic.

Figure 4:
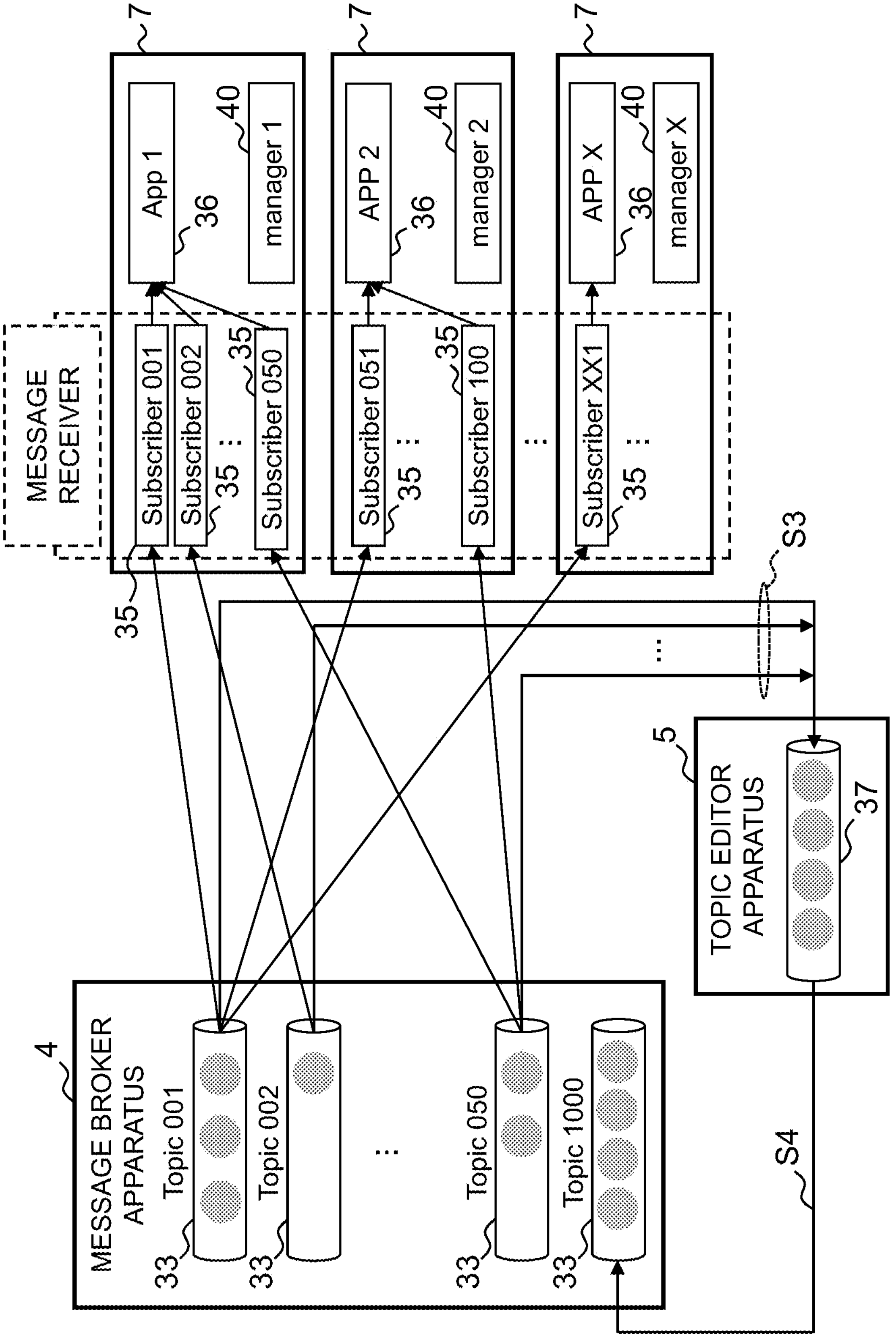
FIG. 4 is a block diagram for describing a topic integration and integration cancellation function installed on the message distribution system of the present embodiment.

Thereafter, as illustrated in FIG. 4, the topic editor apparatus 5 starts the subscription to topics integrated in response to such a topic integration request (S3). Specifically, the topic editor apparatus 5 reads messages on respective topics constituting the integrated topic from the corresponding message queue 33 of the message broker apparatus 4 periodically, and stores the read messages in a message queue 37 generated in the topic editor apparatus 5 itself in association with such an integrated topic.

The topic editor apparatus 5 transmits each message stored in such a message queue 37 to the message broker apparatus 4 periodically (S4). Thus, the message broker apparatus 4 stores each message on the integrated topic provided from the topic editor apparatus 5 in the message queue 33 for an integrated topic generated in association with the integrated topic.

Figure 5:
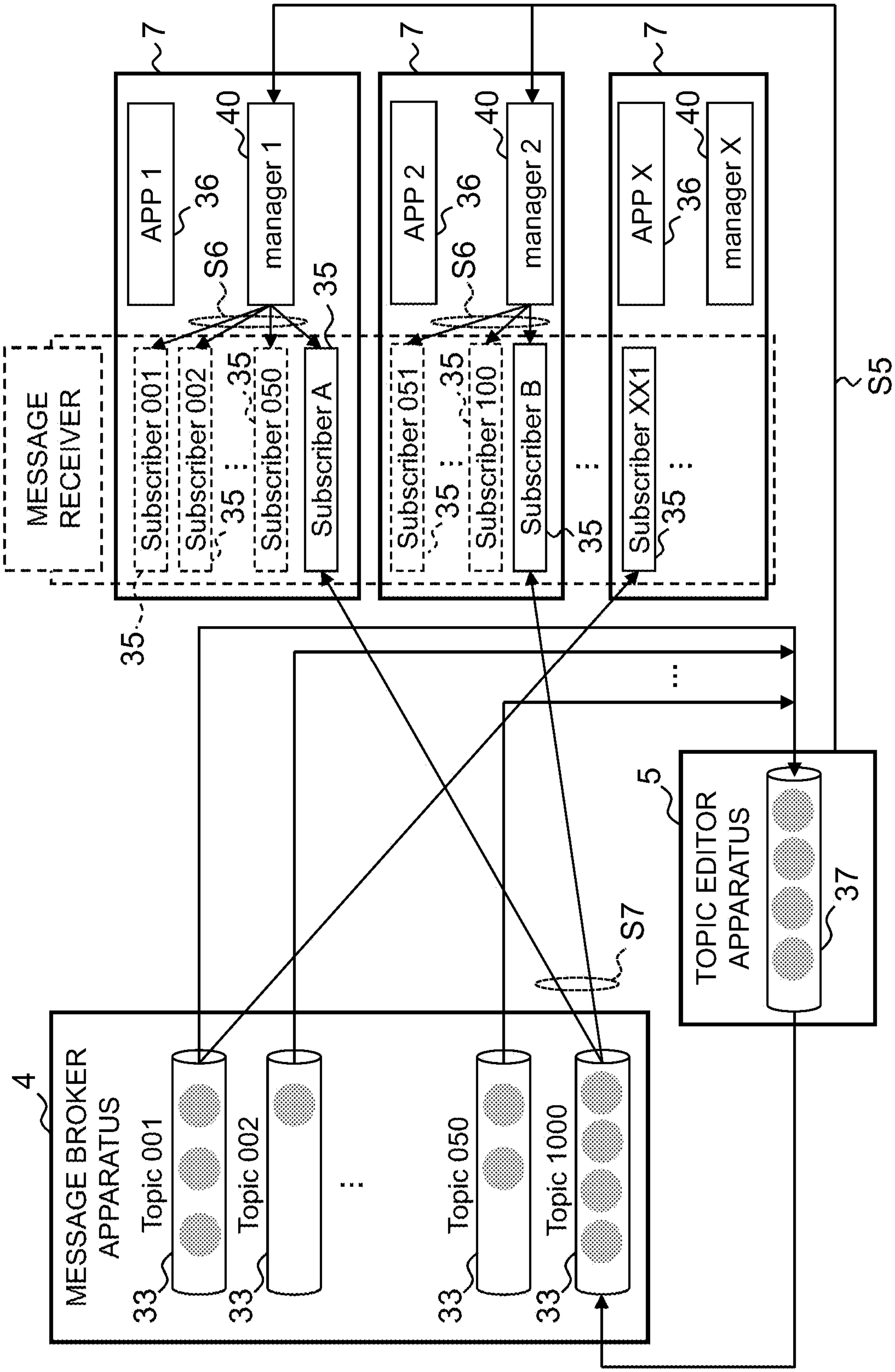
FIG. 5 is a block diagram for describing a topic integration and integration cancellation function installed on the message distribution system of the present embodiment.

In parallel with this, as illustrated in FIG. 5, the topic editor apparatus 5 notifies each manager 40 that has transmitted the topic integration requests requesting to integrate topics integrated as described above until then of the fact that the requested topics are to be integrated as well as identification information on the integrated topic into which the topics are integrated (S5).

Each manager 40 that has received the notification starts the subscription to such an integrated topic and executes a subscription switching process for stopping the subscription to individual topics integrated into the integrated topic.

Specifically, the manager 40 newly generates a subscriber (hereinafter, this is referred to as a "subscriber for an integrated topic") 35 associated with such an integrated topic in the own message receiving apparatus 7. In FIG. 5, "Subscriber A" and "Subscriber B" correspond to the subscriber for an integrated topic. The manager 40 deletes the subscribers 35 provided in the own message receiving apparatus 7 in association with the topics integrated into such an integrated topic (S6). In FIG. 5, "Subscriber 001" to "Subscriber 050" and "Subscriber 050" to "Subscriber 100" correspond to the subscriber to be deleted.

As a result, thereafter, in the message receiving apparatus 7 in which the subscriber 35 for an integrated topic is generated, each message stored in the message queue 33 for an integrated topic in the message broker apparatus 4 is read by the subscriber 35 for an integrated topic and is output to the application 36 (S7).

Figure 6:
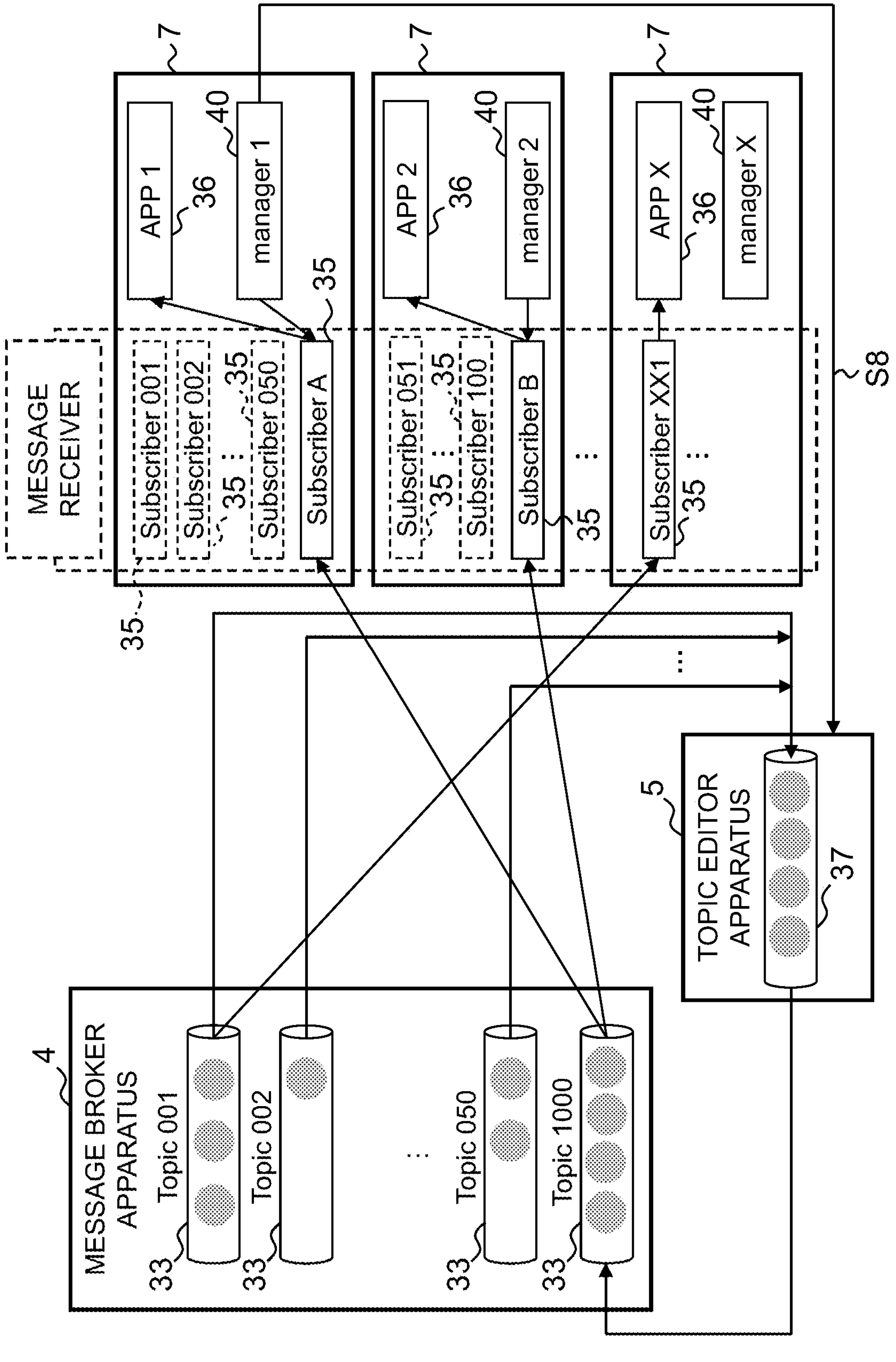
FIG. 6 is a block diagram for describing a topic integration and integration cancellation function installed on the message distribution system of the present embodiment.

On the other hand, as illustrated in FIG. 6, the manager 40 transmits, when the own message receiving apparatus 7 performs a predetermined operation to receive an input for stopping the subscription to some topics included in the topics (integrated topic) integrated as described above, a request (hereinafter, this is referred to as a "topic integration withdrawal request") to withdraw the topic integration request to the topic editor apparatus 5 (S8).

Then, the topic editor apparatus 5 that has received the topic integration withdrawal request determines whether the number of the message receiving apparatuses 7 (the number of subscriptions to the integrated topic as a target of the topic integration withdrawal request (hereinafter, this is referred to as an integrated topic to be canceled) except for the message receiving apparatus(es) 7 that has transmitted the topic integration withdrawal request) that are currently subscribing to the integrated topic to be canceled is equal to or larger than a preset threshold (hereinafter, this is referred to as an "integration cancellation threshold").

Figure 7:
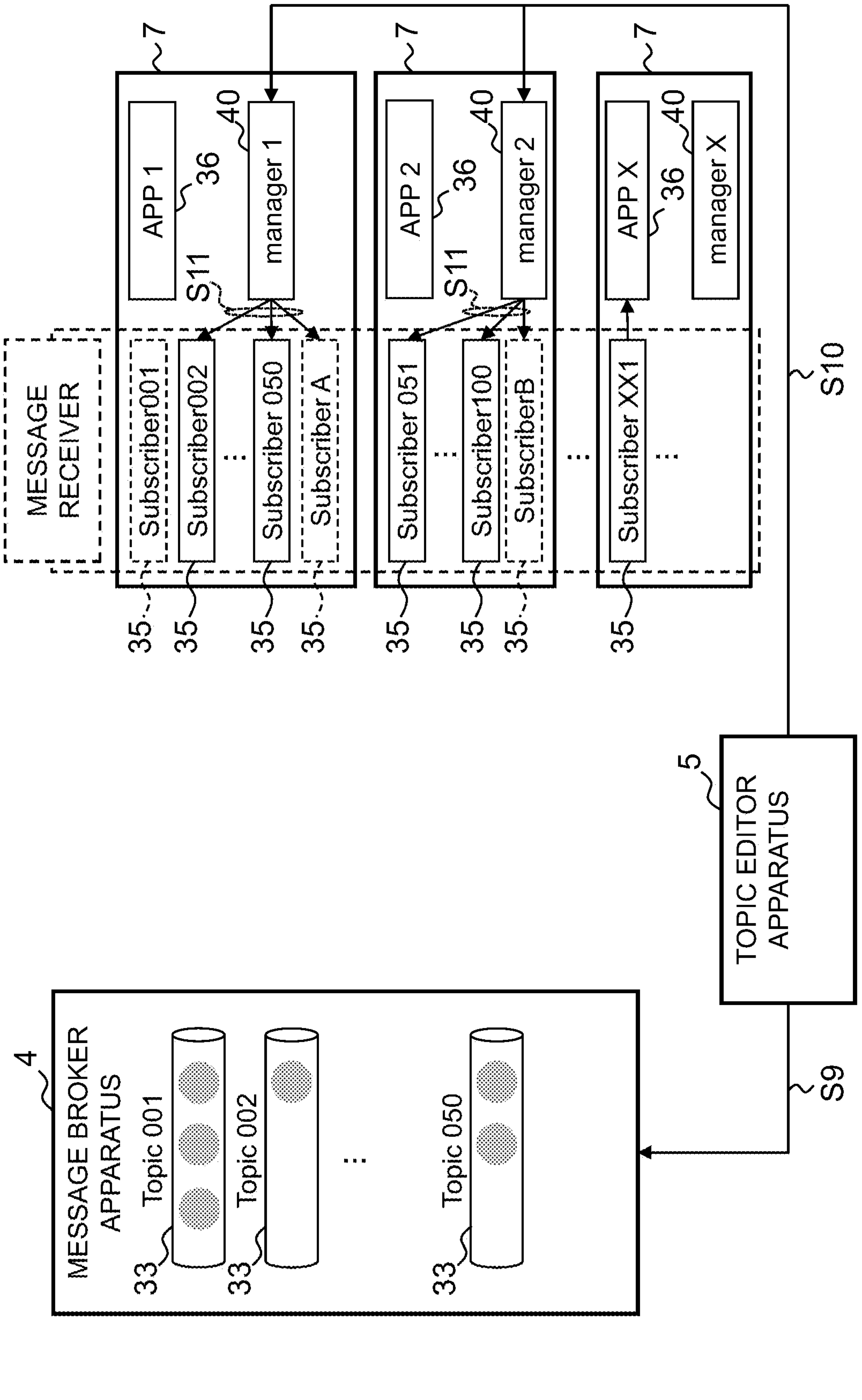
FIG. 7 is a block diagram for describing a topic integration and integration cancellation function installed on the message distribution system of the present embodiment.

As illustrated in FIG. 7, the topic editor apparatus 5 provides, when obtaining a positive result in this determination, an instruction to the message broker apparatus 4 to cancel the integrated topic (S9). Thus, the message broker apparatus 4 executes a process for stopping the subscription to the integrated topic by deleting the corresponding message queue 33 for an integrated topic according to such an instruction.

The topic editor apparatus 5 transmits, to the manager 40 of each message receiving apparatus 7 that has subscribed to the integrated topic until then, integration cancellation notification that the integrated topic is integration-canceled (S10).

Then, the manager 40 that has received the integration cancellation notification generates, in the own message receiving apparatus 7, a subscriber 35 corresponding to each topic that continues to be subscribed to among the topics constituting the integrated topic again, and stops the subscription to the integrated topic to be integration-canceled by deleting the subscriber 35 for an integrated topic associated with the integrated topic (S11).

Figure 8:
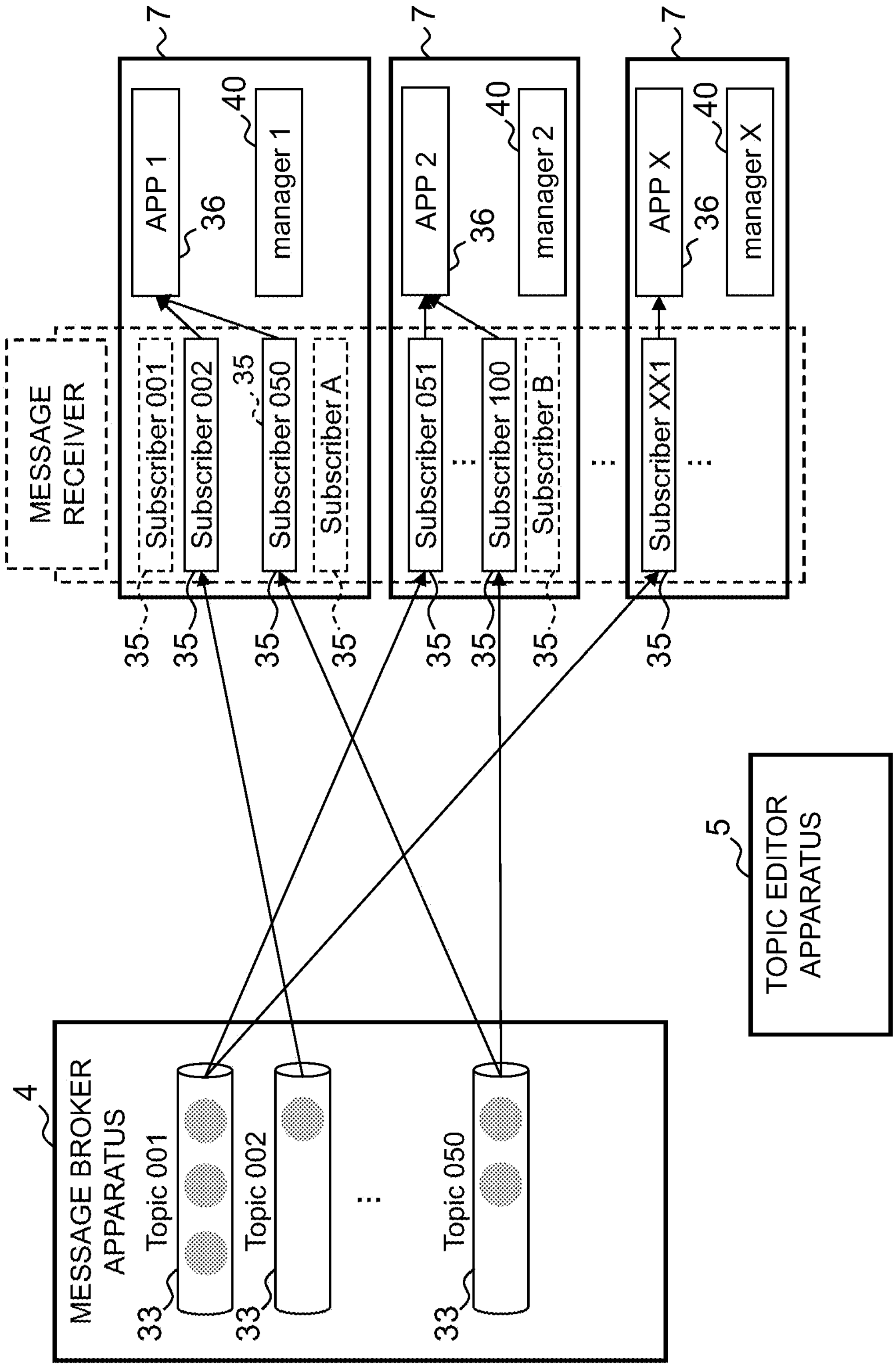
FIG. 8 is a block diagram for describing a topic integration and integration cancellation function installed on the message distribution system of the present embodiment.

As a result, as illustrated in FIG. 8, thereafter, in each message receiving apparatus 7, each subscriber 35 generated at this time reads messages on necessary topics from the corresponding message queue 33 of the message broker apparatus 4, and the read messages are output to the application 36 cooperating with the subscriber 35.

Figure 9:
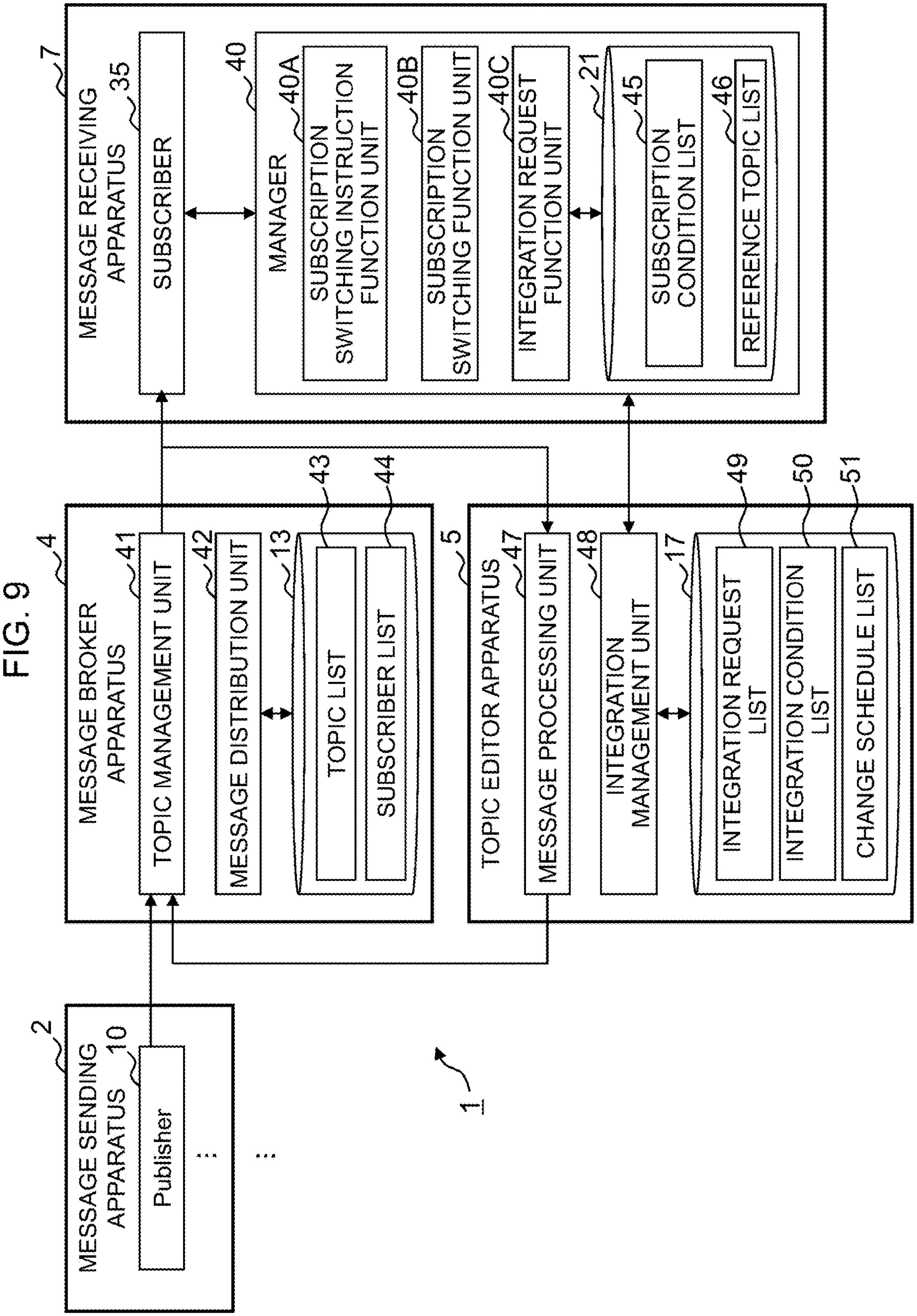
FIG. 9 is a block diagram illustrating a logical configuration of the message distribution system of the present embodiment related to the topic integration and integration cancellation function.

As means for implementing a function (hereinafter, this is referred to as a "topic integration and integration cancellation function") of autonomously performing the integration and integration cancellation of the topics as described above, in a case of the present embodiment, the message broker apparatus 4 is provided with a topic management unit 41 and a message distribution unit 42, as illustrated in FIG. 9. In the storage apparatus 13 of the message broker apparatus 4, the topic list 43 and the subscriber list 44 are stored as management information.

The topic list 43 is a list in which the correspondences between the message queues 33 (FIGS. 3 to 8) created in the message broker apparatus 4 and the topics are registered, and the subscriber list 44 is a list in which the relationship between each topic and each subscriber 35 is registered. The detailed description of the topic list 43 and subscriber list 44 will be omitted.

Each of the topic management unit 41 and the message distribution unit 42 is a function unit embodied by the CPU 11 (FIG. 1) of the message broker apparatus 4 executing a corresponding program loaded from the storage apparatus 13 (FIG. 1) into the memory 12 (FIG. 1).

The topic management unit 41 has a function of managing the correspondences between the message queues 33 created in the message broker apparatus 4 and the topics corresponding to the respective message queues 33 using the topic list 43. The topic management unit 41 also has a function of managing the correspondence between each topic and the subscriber 35 that subscribes to the topic using the subscriber list 44.

The message distribution unit 42 has functions of referring to the topic list 43 and the subscriber list 44 to store a message transmitted from the publisher 10 of the message sending apparatus 2 in the corresponding message queue 33 (FIGS. 3 to 8) and manage it, and distributing, in response to a request from the subscriber 35 of the message receiving apparatus 7, the message stored in the corresponding message queue 33 to the subscriber 35.

Furthermore, the message distribution unit 42 also has a function of creating the above-described message queue 33 for an integrated topic in response to the request from an integration management unit 48 (FIG. 9) (which will be described later) of the topic editor apparatus 5, and then, storing, in the message queue 33 for an integrated topic, the messages on the respective topics constituting the integrated topic provided from the topic editor apparatus 5.

On the other hand, as described above, the manager 40 is installed in the message receiving apparatus 7 in addition to one or more subscribers 35. Each of the topic management unit(s) 35 and the manager 40 is a function unit embodied by the CPU 19 (FIG. 1) of the message receiving apparatus 7 executing a corresponding program loaded from the storage apparatus 21 (FIG. 1) into the memory 20 (FIG. 1).

The subscriber 35 has a function of accessing the message broker apparatus 4 periodically to read a message from the message queue 33 for the topic associated with the subscriber 35 itself, and outputting the read message to the application 36 (FIGS. 3 to 8) cooperating with the subscriber 35, the application 36 being installed on the own message receiving apparatus 7.

The manager 40 includes an integration request function unit 40C, a subscription switching instruction function unit 40A, and a subscription switching function unit 40B, and stores the subscription condition list 45 and the reference topic list 46 in the storage apparatus 21 to manage then.

The subscription condition list 45 is a list used to manage the current subscription conditions of the topics of the own message receiving apparatus 7, and as illustrated in FIG. 10(A), is configured by including a subscriber name column 45A, a subscription topic name column 45B, and a subscription flag column 45C. In the subscription condition list 45, one record (row) corresponds to one topic subscribed to by the own message receiving apparatus 7.

In the subscription topic name column 45B, a name (topic name) of the corresponding topic subscribed to by the message receiving apparatus 7 is stored, and in the subscriber name column 45A, a name (subscriber name) of the subscriber associated with the topic is stored.

In the subscription flag column 45C, a flag (hereinafter, this is referred to as a "subscription flag") indicating whether the own message receiving apparatus 7 is currently subscribing to the corresponding topic is stored. In a case of the present embodiment, the subscription flag is set to "1" when the own message receiving apparatus 7 is subscribing to the corresponding topic, and is set to "0" when the subscription to such a topic is canceled.

Accordingly, an example of FIG. 10(A) indicates that, in the corresponding message receiving apparatus 7, for example, the subscriber 35 called "Subscriber 1" is associated with a topic called "Topic 1", and the topic called "Topic 1" is also being currently subscripted (the subscription flag is set to "1").

Note that when the message receiving apparatus 7 starts the subscription to the integrated topic into which the topics having been subscripted until then are integrated, as illustrated in FIG. 10(B), a record of the integrated topic is additionally registered with the subscription condition list 45. At this time, the record of each of topics integrated into such an integrated topic is not deleted, and the subscription flag for these topics is updated to "0".

The reference topic list 46 is a list used to manage the topics that are being currently subscribed to by the own message receiving apparatus 7, and all the topics that are being currently subscribed to by the own message receiving apparatus 7 are registered with the reference topic list 46. As illustrated in FIG. 11, the reference topic list 46 is configured by including a number column 46A and a subscription topic name column 46B. In the reference topic list 46, one record (row) corresponds to one topic being currently subscribed to by the own message receiving apparatus 7.

In the subscription topic name column 46B, a topic name of the corresponding topic that is being currently subscripted by the own message receiving apparatus 7 is stored. In the number column 46A, a number assigned to the corresponding topic on the reference topic list 46 is stored. In a case of the present embodiment, sequence numbers starting from "1" are used as such numbers. Accordingly, an example of FIG. 11 indicates that the corresponding message receiving apparatus 7 is currently subscribing to three topics of "Topic 1", "Topic 2", and "Topic 3".

The integration request function unit 40C is a function unit having a function of monitoring the topic subscription number of the own message receiving apparatus 7 using the reference topic list 46 and transmitting a topic integration request to the topic editor apparatus 5 when the topic subscription number exceeds the above-described topic subscription number threshold. The integration request function unit 40C also has a function of transmitting the above-described topic integration withdrawal request to the topic editor apparatus 5 when an operation of deleting the subscription to some topics included in the integrated topic is input.

The subscription switching instruction function unit 40A is a function unit having a function of transmitting, to the subscription switching function unit 40B, a subscription switching instruction to switch the topics to be subscribed to from the integrated topic to each topic that continues to be subscribed to among individual topics constituting the integrated topic when the notification that the integrated topic is integration-canceled is provided from the topic editor apparatus 5 as described later.

The subscription switching function unit 40B is a function unit having a function of generating a necessary subscriber 35 or deleting an unnecessary subscriber 35 according to the subscription switching instruction provided from the subscription switching instruction function unit 40A.

On the other hand, the topic editor apparatus 5 is provided with a message processing unit 47 and an integration management unit 48 as function units. In the storage apparatus 17 of the topic editor apparatus 5, an integration request list 49, an integration condition list 50 and a change schedule list 51 are stored as management information.

The integration request list 40 is a list used to manage the topic integration requests that have been received by the topic editor apparatus 5 up to now, and as illustrated in FIG. 12, is configured by including an integration request topic column 49A, a requestor's manager name column 49B, and a number-of-requests column 49C. In the integration request list 49, one record (row) corresponds to one type of combinations (hereinafter, this is referred to as a "topic combination") of the topics requested to be integrated in the topic integration requests that have been received by the topic editor apparatus 5 up to now.

In the integration request topic column 49A, topic names of all the topics constituting the corresponding topic combination are stored, and in the requestor's manager name column 49B, a name of each manager 40 (manager name) that has requested to integrate topics in the topic combination until now is stored. Furthermore, in the number-of-requests column 49C, the number of the managers 40 that requests to integrate topics in the topic combination at that time is stored.

Accordingly, an example of FIG. 12 indicates that the topic integration request to integrate "Topic 1", "Topic 2", and "Topic 3" is transmitted from each of "Manager 1" and "Manager 4", and the number of the managers 40 that requests to integrate these topics at the present time is "2".

The integration condition list 50 is a list used to manage the integration conditions for the topics at the present time, and as illustrated in FIG. 13, is configured by including an integration request topic column 50A, a requestor's manager name column 50B, a post-integration topic name column 50C, and a number-of-requests column 50D. In the integration condition list 50, one record (row) corresponds to one integrated topic that is present at the present time.

In the post-integration topic name column 50C, the topic name assigned to the corresponding integrated topic is stored, and in the integration request topic column 50A, topic names of the respective topics integrated as the integrated topic is stored. In the requestor's manager name column 50B, manager names of the respective managers 40 that have requested to integrate the topics are stored, and in the number-of-requests column 50D, the number of the managers 40 that request to create such an integrated topic at that time is stored.

Accordingly, an example of FIG. 13 indicates that an integrated topic having a topic name called "Topic 5" into which three topics of "Topic 1", "Topic 2", and "Topic 3" are integrated is still currently present, and "two" managers 40 of "Manager 1" and "Manager 4" are still currently requesting that the integrated topic persists.

The change schedule list 51 is a list used to manage the topic integration withdrawal request that has been received by the topic editor apparatus 5, and as illustrated in FIG. 14, is configured by including an integration request topic column 51A, a requestor's manager name column 51B, and a number-of-references column 51C. In the change schedule list 51, one record (row) corresponds to one type of topic integration withdrawal request having the same integrated topic to be canceled (the integrated topic to be canceled).

In the integration request topic column 51A, topic names of the respective topic constituting the integrated topic requested to be integration-canceled by the corresponding topic integration withdrawal request are stored, and in the requestor's manager name column 51B, manager names of all the managers 40 that have requested to integration-cancel the integrated topic are stored. Furthermore, in the number-of-references column 51C, the number of subscriptions to the integrated topic at the present time is stored.

Accordingly, an example of FIG. 14 indicates that regarding the topic integration withdrawal request for the integrated topic into which three topics of "Topic 1", "Topic 2", and "Topic 3" are integrated, the request being provided from the manager 40 of "Manager 1", the integrated topic is being currently subscribed to by "one" message receiving apparatus 7.

The message processing unit 47 has functions of reading and acquiring, from the message broker apparatus 4, messages on the respective topics constituting the corresponding integrated topic, the messages being generated for each of the integrated topics by the integration management unit 48, which will be described later, and transmitting the acquired messages to the message distribution unit 42 of the message broker apparatus 4. Then, the messages are stored in the message queue 33 for an integrated topic provided in association with the corresponding integrated topic in the message broker apparatus 4.

The integration management unit 48 has a function of managing the topic integration requests provided from the manger 40 of each message receiving apparatus 7, and, when the number of times of the same topic integration requests is equal to or larger than the integration request threshold, executing, in response to the topic integration request, a process for integrating the corresponding topics and providing an instruction to the manager 40 that has transmitted the topic integration request to switch the topics to be subscribed to an integrated topic generated by such integration.

The integration management unit 48 also has a function of managing the topic integration withdrawal requests provided from the manger 40 of each message receiving apparatus 7, and, when the current number of subscriptions to the integrated topic is smaller than the integration cancellation threshold, executes a process for integration-canceling the integrated topic and providing an instruction to the manager 40 of the message receiving apparatus 7 that is subscribing to the integrated topic to switch the topics to be subscribed to from such an integrated topic to individual topics constituting the integrated topic.

(3) Various Processes Executed in Association With Topic Integration and Integration Cancellation Function Next, a description will be provided about specific processing contents of various processes executed in this message distribution system 1 in association with the above-described topic integration and integration cancellation function. Note that in the following description, a processing subject of each of various processes will be described as a program ("XX unit"); however, it is needless to say that the corresponding CPU 15, 19 actually executes the process according to the program.

(3-1) Topic Integration Request Process

Figure 15:
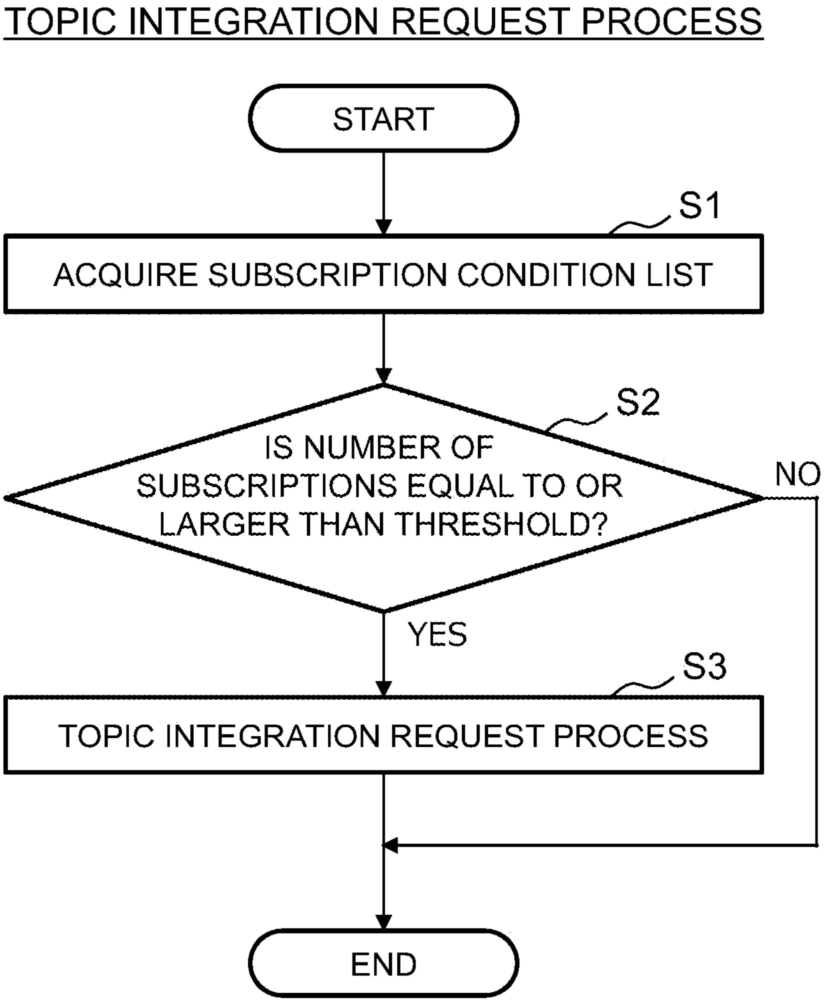
FIG. 15 is a flowchart illustrating a processing procedure of a topic integration request process.

FIG. 15 illustrates a flow of a series of processes (hereinafter, this is referred to as a "topic integration request process") executed by the integration request function unit of the manager 40 installed in the message receiving apparatus 7 when a user performs a predetermined operation on the message receiving apparatus 7 to add a topic to be subscribed to.

The integration request function unit 40C starts the topic integration request process illustrated in FIG. 15 when the topic to be subscribed to is added in the own message receiving apparatus 7. Then, the integration request function unit 40C first reads and acquires the subscription condition list 45 (FIG. 10(A)) from the storage apparatus 21 (FIG. 1) (S1).

Subsequently, the integration request function unit 40C determines whether the current number of subscriptions to topics in the own message receiving apparatus 7 is equal to or larger than the above-described topic subscription number threshold on the basis of the acquired subscription condition list 45 (S2). Then, when obtaining a negative result in the determination, the integration request function unit 40C ends the topic integration request process.

In contrast, when obtaining a positive results in the determination in step S2, the integration request function unit 40C transmits, to the topic editor apparatus 5, the topic integration request that requests to integrate all the topics that are being currently subscribed to by the own message receiving apparatus 7 (S3), and then, ends the topic integration request process.

(3-2) Integration Management Process

Figure 16:
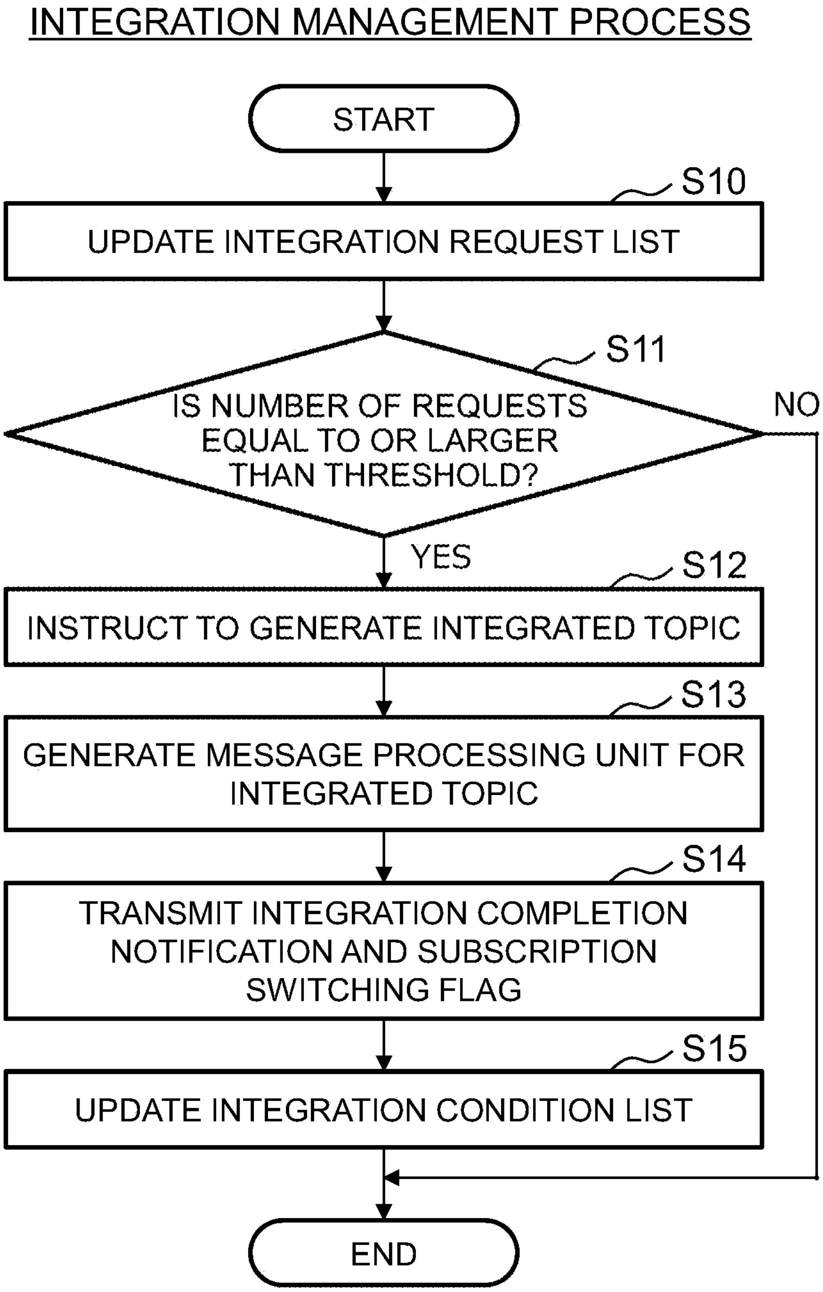
FIG. 16 is a flowchart illustrating a processing procedure of an integration management process.

On the other hand, FIG. 16 illustrates a flow of a series of processes (hereinafter, this is referred to as an "integration management process") executed by the integration management unit 48 (FIG. 9) of the topic editor apparatus 5 that has received the topic integration request.

When receiving the topic integration request, the integration management unit 48 starts the integration management process illustrated in FIG. 16, and first, updates the integration request list 49 (FIG. 12) (S10).

Specifically, when the topic integration request having the same contents (the topics to be integrated are all the same) as the topic integration request that has been received this time has already been registered with the integration request list 49, the integration management unit 48 additionally stores the manager name of the manager 40 that has transmitted the topic integration request this time in the requestor's manager name column 49B (FIG. 12) of the record corresponding to the topic integration request, and increments a value stored in the number-of-requests column 49C (FIG. 12) of the record (by one).

Alternatively, when the topic integration request having the same contents as the topic integration request that has been received this time has not been registered with the integration request list 49, the integration management unit 48 secures an unused record in the integration request list 49 and stores topic names of the respective topics requested to be integrated by the topic integration request that has been received this time in the integration request topic column 49A (FIG. 12) of the record. In addition, the integration management unit 48 stores a manager name of the manager 40 that has transmitted the topic integration request in the requestor's manager name column 49B of the record, and stores "1" in the number-of-request column 49C of the record.

Subsequently, the integration management unit 48 refers to the number-of-requests column 49C of the record updated in step S10 to determine whether the value stored in the number-of-requests column 49C is equal to or larger than the above-described integration request threshold (S11). Then, when obtaining a negative result in the determination, the integration management unit 48 ends the integration management process.

In contrast, when obtaining a positive result in the determination in step S11, the integration management unit 48 provides an instruction to the message broker apparatus 4 to generate an integrated topic into which all the topics requested to be integrated in the topic integration request received this time are integrated (S12). Thus, the topic management unit 41 of the message broker apparatus 4 that has received the instruction creates such an integrated topic to register it with the topic list 43 (FIG. 9) and generates a new message queue 33 for an integrated topic (FIGS. 3 to 8) corresponding to the created integrated topic.

In addition, the integration management unit 48 generates, in the topic editor apparatus 5, the message processing unit 47 corresponding to such an integrated topic and the message queue 37 (FIGS. 4 to 6) associated with the integrated topic (S13). Thus, thereafter, the message processing unit 47 stores messages on the respective topics constituting such an integrated topic read from the message broker apparatus 4 in the corresponding message queue 37, and transmits the messages stored in the message queue 37 to the message broker apparatus 4 as appropriate.

Next, the integration management unit 48 specifies the managers 40 that have transmitted the topic integration requests (including the present topic integration request) having the same contents as the topic integration request serving as a trigger for starting the integration management process this time with reference to the integration request list 49, and transmits, to the specified managers 40, integration completion notification that the requested integration of topics has been completed and the subscription switching flag information (S14).

Note that such integration completion notification also includes information about topic names of the respective topics to be integrated and a topic name of the integrated topic. The term "subscription switching flag information" is information representing to which portion the message receiving apparatuses 7 in which the managers 40 to which the above-described integration completion notification has been transmitted are installed read the messages of the respective topics integrated this time. The integration management unit 48 acquires the subscription switching flag information for each of such message receiving apparatuses 7 from the message broker apparatus 4, and transmits the acquired subscription switching flag information to the corresponding manager 40.

Subsequently, the integration management unit 48 updates the integration condition list 50 (FIG. 13) (S15). Specifically, the integration management unit 48 secures an unused record in the integration condition list 50 and stores topic names of the respective topics integrated this time in the integration request topic column 50A (FIG. 13) of the record, and stores manager names of all the managers 40 that have requested to integrate the topics in the requestor's manager name column 50B (FIG. 13) of the record. In addition, the integration management unit 48 stores a topic name assigned to the integrated topic created by the present integration in the post-integration topic name column 50C of the record, and stores the number of topic reception requests that have been received until then in the number-of-requests column 50D of the record, the topic reception requests requesting to integrate the topics.

Then, the integration management unit 48 ends the integration management process.

(3-3) Subscription Switching Process

Figure 17:
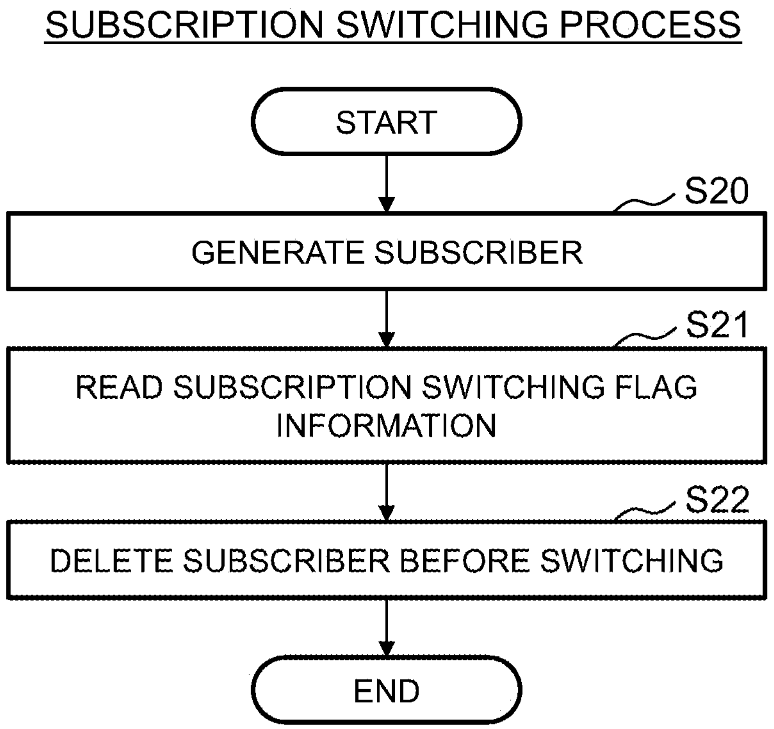
FIG. 17 is a flowchart illustrating a processing procedure of a subscription switching process.

FIG. 17 illustrates a flow of a series of processes (hereinafter, this is referred to as a "subscription switching process") executed by the subscription switching function unit 40B (FIG. 9) of the manager 40 that has received the above-described integration completion notification and subscription switching flag information transmitted from the topic editor apparatus 5.

When the manager 40 receives the integration completion notification and subscription switching flag information, the subscription switching instruction function unit 40A of the manager 40 transmits a subscription switching instruction to the subscription switching function unit 40B. Note that the subscription switching instruction also includes information about topic names of the respective topics to be integrated and a topic name of the integrated topic.

When receiving the subscription switching instruction, the subscription switching function unit 40B starts the subscription switching process illustrated in FIG. 17, and generates the subscriber 35 (FIG. 9) corresponding to the integrated topic created at that time in the own message receiving apparatus 7 (S20).

Subsequently, the subscription switching function unit 40B reads the subscription switching flag information, and sets the messages that the subscription is to be started on the respective topics constituting the integrated topic, in the subscriber 35 generated in step S20 (S21).

Next, the subscription switching function unit 40B deletes all the subscribers 35 in the own message receiving apparatus 7, the subscribers 35 having been provided to correspond to the respective topics integrated into such an integrated topic (S22), and then, ends the subscription switching process.

(3-4) Topic Integration Withdrawal Request Process

Figure 18:
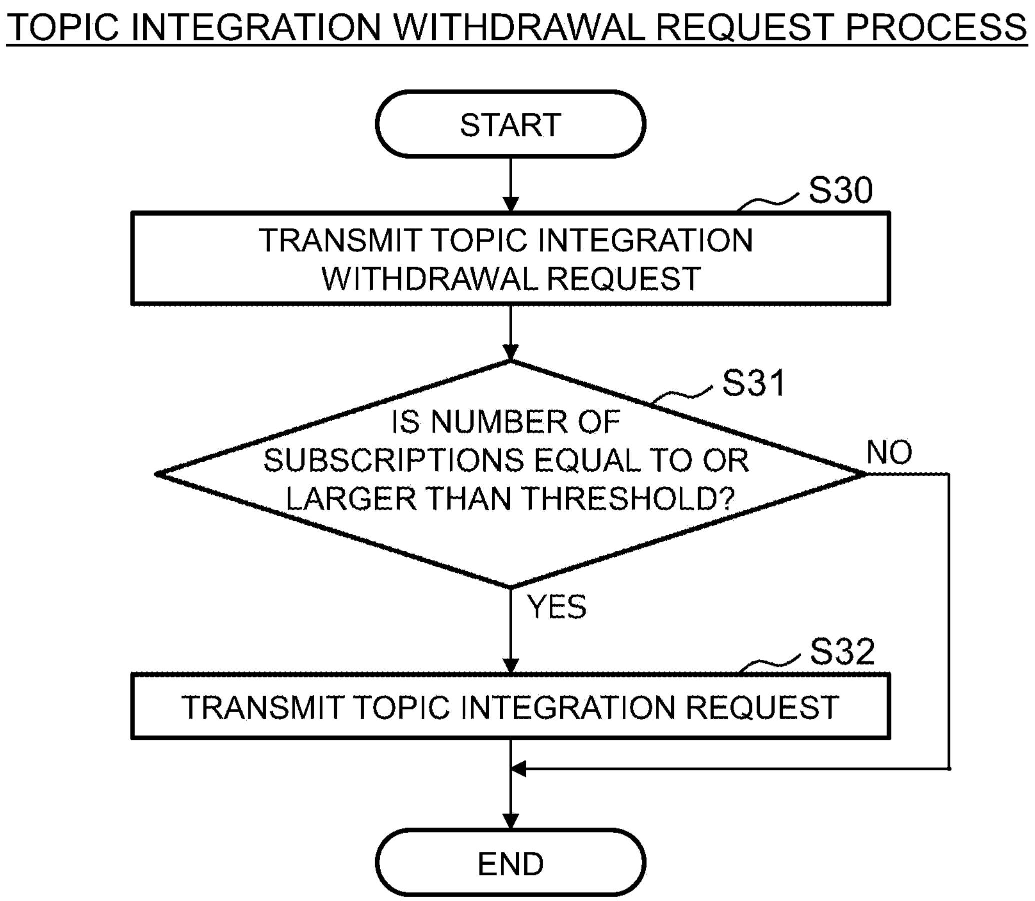
FIG. 18 is a flowchart illustrating a processing procedure of a topic integration withdrawal request process.

FIG. 18 illustrates a flow of a series of processes (hereinafter, this is referred to as a "topic integration withdrawal request process") executed by the integration request function unit 40C of the manager 40 installed in the message receiving apparatus 7 when a user performs a predetermined operation on the message receiving apparatus 7 to instruct to cancel the subscription to some topics included in the integrated topic that is being currently subscribed to.

The integration request function unit 40C starts the topic integration withdrawal request process illustrated in FIG. 18 when the subscription to the topics is canceled by the user. Then, the integration request function unit 40C first transmits, to the topic editor apparatus 5, a topic integration withdrawal request specifying the integrated topic that is subscribed to by the own message receiving apparatus 7 at that time (S30).

Subsequently, the integration request function unit 40C determines whether the total number of topics that is subscribed to by the own message receiving apparatus 7 except for the topics (hereinafter, this is referred to as "subscription cancellation target topics") instructed to be subscription-canceled is equal to or larger than the above-described topic subscription number threshold (S31). Then, when obtaining a negative result in the determination, the integration request function unit 40C ends the topic integration withdrawal request process.

In contrast, when obtaining a positive results in the determination in step S31, the integration request function unit 40C transmits, to the topic editor apparatus 5, the topic integration request that requests to integrate the topics that are subscribed to by the own message receiving apparatus 7 except for the subscription cancellation target topic(s) (S32), and then, ends the topic integration withdrawal request process.

Note that the above-described integration management process is executed in the topic editor apparatus 5 as described in FIG. 16 on the basis of the topic integration request transmitted to the topic editor apparatus 5 in step S32, and furthermore, the above-described subscription switching process is executed according to the conditions as described in FIG. 17.

(3-5) Integration Cancellation Process

Figure 19:
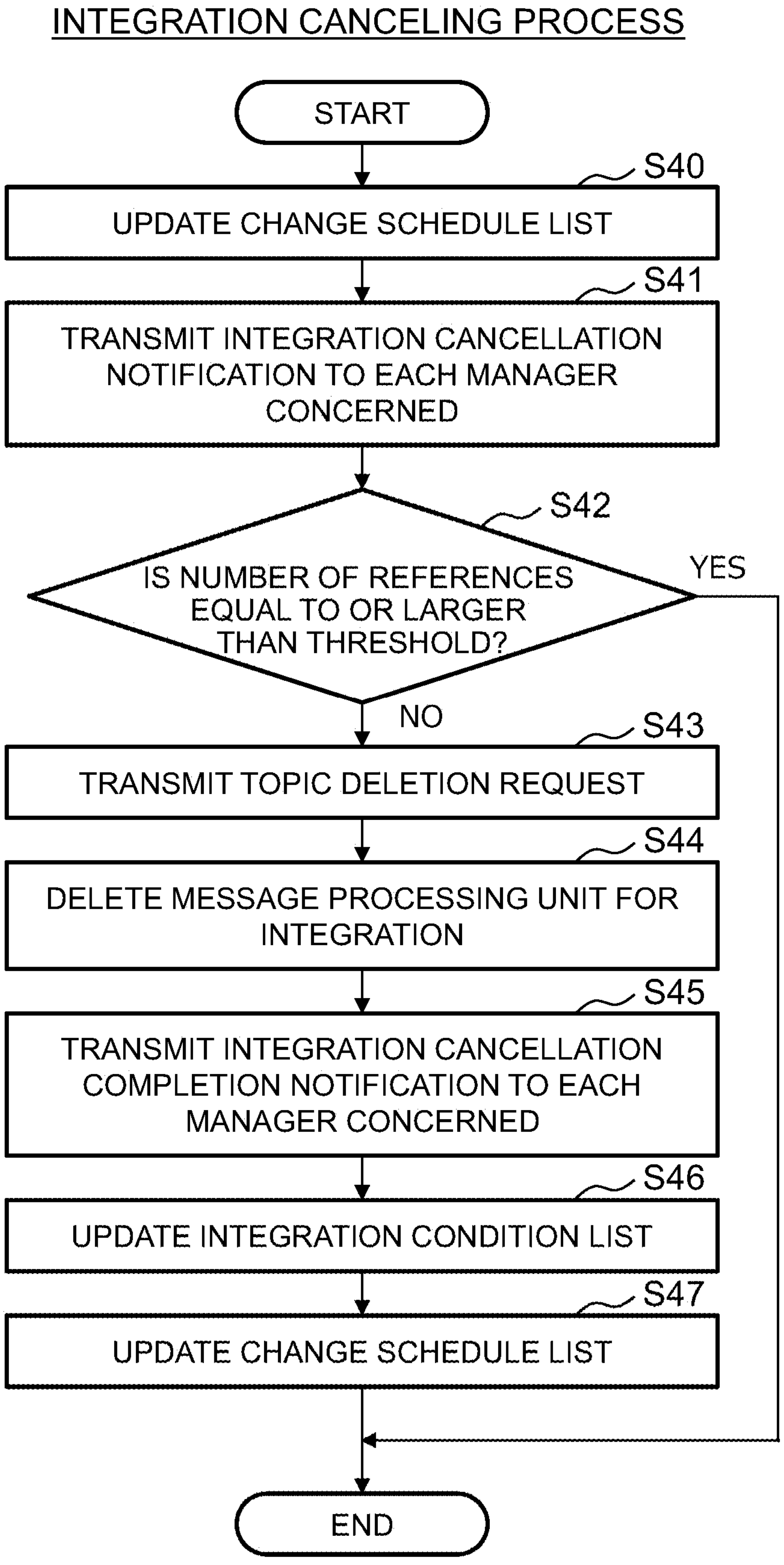
FIG. 19 is a flowchart illustrating a processing procedure of an integration canceling process.

FIG. 19 illustrates a flow of a series of processes (hereinafter, this is referred to as an "integration cancellation process") executed by the integration management unit 48 of the topic editor apparatus 5 that has received the above-described topic integration withdrawal request.

When receiving the topic integration withdrawal request, the integration management unit 48 starts the integration cancellation process illustrated in FIG. 19, and first, updates the change schedule list 51 (FIG. 14) (S40).

Specifically, when the topic integration withdrawal request having the same contents (the integrated topics to be integration-canceled are the same) as the topic integration withdrawal request that has been received this time has already been registered with the change schedule list 51, the integration management unit 48 stores the manager name of the manager 40 that has transmitted the topic integration withdrawal request this time in the requestor's manager name column 51B (FIG. 14) of the record corresponding to the topic integration withdrawal request. In addition, the integration management unit 48 acquires, from the integration condition list 50, the number of message receiving apparatuses 7 that are subscribing to the integrated topic requested to be integration-canceled by the present topic integration withdrawal request, and stores the number obtained by subtracting "1" from the number of message receiving apparatuses 7 (the number obtained by subtracting the number of message receiving apparatuses 7 in which the managers 40 that have transmitted the present topic integration withdrawal request are installed) in the number-of-references column 51C of the record.

Alternatively, when the topic integration withdrawal request having the same contents as the topic integration withdrawal request that has been received this time has not been registered with the change schedule list 51, the integration management unit 48 secures an unused record in the change schedule list 51 and stores topic names of the respective topics constituting the integrated topic requested to be integration-canceled by the topic integration withdrawal request that has been received this time in the integration request topic column 49A (FIG. 12) of the record. In addition, the integration management unit 48 acquires, from the integration condition list 50, the number of message receiving apparatuses 7 that are subscribing to the integrated topic requested to be integration-canceled by the present topic integration withdrawal request, and stores the number obtained by subtracting "1" from the number of message receiving apparatuses 7 in the number-of-references column 51C of the record.

Subsequently, the integration management unit 48 transmits the integration cancellation notification that the integrated topic requested to be integration-canceled by the topic integration withdrawal request is to be integration-canceled, to all the managers 40 whose manager names are stored in the requestor's manager name column 51B of the record corresponding to the topic integration withdrawal request in the change schedule list 51 (S41).

Next, the integration management unit 48 determines whether the number (corresponds to the number of message receiving apparatuses 7 that are currently subscribing to the integrated topic requested to be integration-canceled by the present topic integration withdrawal request) stored in the number-of-references column 51C of the record in the change schedule list 15 updated in step S40 is equal to or larger than the above-described integration cancellation threshold for canceling the integrated topic (S42).

Then, when obtaining a positive result in the determination, the integration management unit 48 ends the integration cancellation process. Accordingly, in this case, the integrated topic requested to be integration-canceled by such a topic integration withdrawal request is not integration-canceled.

In contrast, when obtaining a negative result in the determination in step S42, the integration management unit 48 executes a process of integration-canceling the integrated topic requested to be integration-canceled by such a topic integration withdrawal request (S43 to S45).

Specifically, the integration management unit 48 first transmits, to the message broker apparatus 4, a topic deletion request that requests to integration-cancel the integrated topic requested to be integration-canceled by such a topic integration withdrawal request (S43). Thus, when receiving the topic deletion request, the message broker apparatus 4 deletes the message queue 33 for an integrated topic associated with the specified integrated topic and deletes the integrated topic from the topic list 43 (FIG. 9).

In addition, the integration management unit 48 deletes the message processing unit 47 (FIG. 9) and the message queue 37 (FIGS. 4 to 6) that are provided in the topic editor apparatus 5 in association with the integrated topic requested to be integration-canceled by such a topic integration withdrawal request (S44). Then, the integration management unit 48 transmits the integration cancellation completion notification that the integration cancellation of the integrated topic has been completed, to each manager 40 that has transmitted the integration cancellation notification in step S42 (S45).

Next, the integration management unit 48 updates the integration condition list 50 (FIG. 13) (S46). Specifically, the integration management unit 48 deletes the record corresponding to the integrated topic that has been integration-canceled as described above, among the records of the integration condition list 50.

In addition, the integration management unit 48 updates the change schedule list 51 (FIG. 14) (S47). Specifically, the integration management unit 48 deletes the record corresponding to the integrated topic that has been integration-canceled as described above, among the records of the integration condition list 51.

Then, the integration management unit 48 ends the integration cancellation process.

(3-3) Subscription Switching Instruction Process

Figure 20:
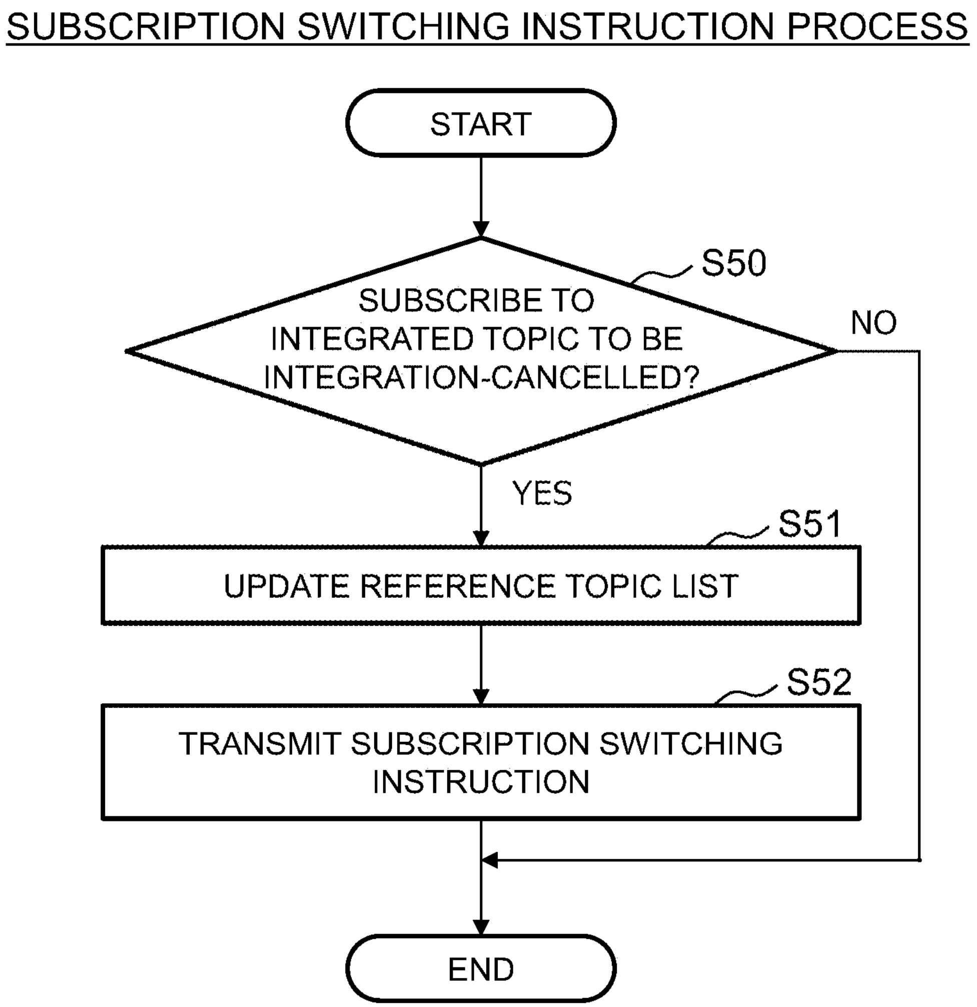
FIG. 20 is a flowchart illustrating a processing procedure of a subscription switching process.

FIG. 20 illustrates a flow of a series of processes (hereinafter, this is referred to as a "subscription switching instruction process") executed by the subscription switching instruction function unit 40A of the manager 40 that has received the integration cancellation notification transmitted by the integration management unit 48 in step S42 of the above-described integration cancellation process as illustrated in FIG. 19.

When receiving such an integration cancellation notification, the subscription switching instruction function unit 40A starts the subscription switching instruction process illustrated in FIG. 20, and first, determines whether the integrated topic to be integration-canceled is subscribed to by the own message receiving apparatus 7 (S50).

Specifically, the subscription switching instruction function unit 40A determines whether the topic name of the integrated topic to be integration-canceled upon receipt of the integration cancellation notification is stored in the subscription topic name column 45B (FIG. 10A) of any record of the subscription condition list 45 (FIG. 10A).

Then, when obtaining a negative result in the determination, the subscription switching instruction function unit 40A ends the subscription switching instruction process.

In contrast, when obtaining a positive result in the determination in step S50, the subscription switching instruction function unit 40A updates the reference topic list 46 (FIG. 11) (S51). Specifically, the subscription switching instruction function unit 40A deletes the integrated topic to be integration-canceled from the reference topic list 46, and acquires the topics constituting the integrated topic from the subscription condition list 45 and registers it with the reference topic list 46.

Subsequently, the subscription switching instruction function unit 40A provides a subscription switching instruction to the subscription switching function unit 40B to switch the topics to be subscribed to from the integrated topic to be currently integration-canceled to individual topics constituting the integrated topic to be integration-canceled (however, the topics to be subscription-canceled are not included) (S52). Then, the subscription switching instruction function unit 40A ends the subscription switching instruction process.

Note that the subscription switching function unit 40B that has received the subscription switching instruction executes the above-described subscription switching process as illustrated in FIG. 17. At this time, in step S20, the subscription switching function unit 40B generates the subscriber 35 (FIG. 9) for each topic constituting the integrated topic that is integration-canceled, and in step S22, deletes the subscriber 35 for an integrated topic for the integrated topic that is integration-canceled.

(4) Specific Example

Next, a description will be provided about a specific example of a series of processes executed in the message distribution system 1 on the basis of the topic integration and integration cancellation function according to the present embodiment, with reference to FIGS. 21 to 26.

Note that in FIGS. 21 to 26, "Subscriber 1" to "Subscriber 5" are the subscribers 35 set to subscribe to the respective topics with the same number ("1" to "5") among the topics of "Topic 1" to "Topic 5", and "manager 1" to "manager 4" are the managers 40 installed in the different message receiving apparatuses 7.

The message receiving apparatuses 7 in which "manager 1" and "manager 4" are installed subscribe to "Topic 1" to "Topic 3", the message receiving apparatus 7 in which "manager 2" is installed subscribes to "Topic 1", "Topic 2", and "Topic 4", and the message receiving apparatus 7 in which "manager 3" is installed subscribes to "Topic 1" and "Topic 2".

In FIGS. 21 to 26, the integration request threshold set for the topic editor apparatus 5 is "2", and the integration cancellation threshold is "1".

Figure 21:
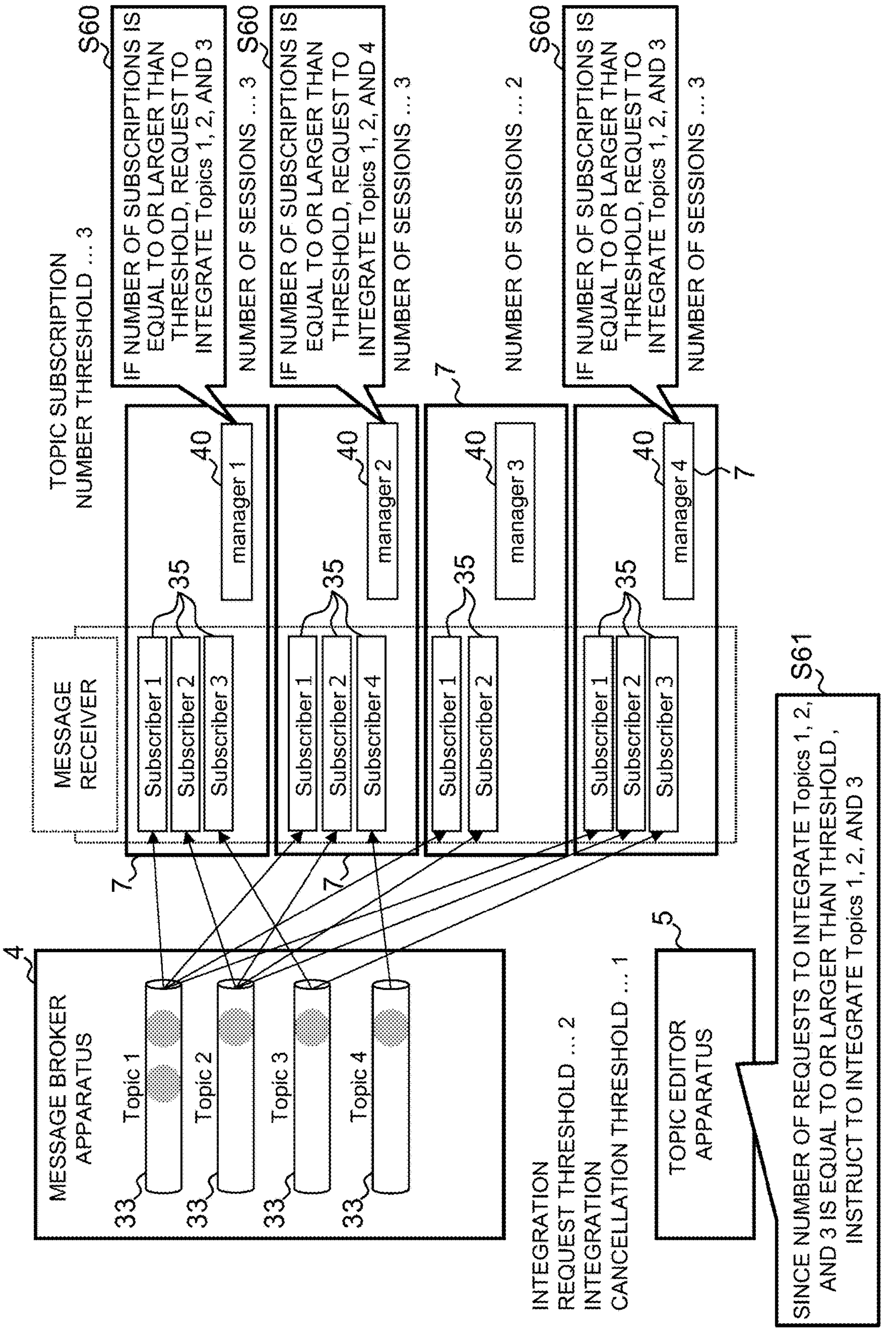
FIG. 21 is a block diagram for describing a specific example of a series of flows performed in the message distribution system on the basis of the topic integration and integration cancellation function of the present embodiment.

Here, when the topic subscription number threshold set for each message receiving apparatus 7 is "3", as illustrated in FIG. 21, the managers 40 of "manager 1" and "manager 4" transmit, to the topic editor apparatus 5, the topic integration request that requests to integrate three topics of "Topic 1", "Topic 2", and "Topic 3", and the manager of "manager 2" transmits, to the topic editor apparatus 5, the topic integration request that requests to integrate three topics of "Topic 1", "Topic 2", and "Topic 4" (S60).

Then, since the total number of receptions of the topic integration requests that request to integrate three topics of "Topic 1", "Topic 2", and "Topic 3" is equal to or larger than "2" of the integration request threshold, the topic editor apparatus 5 that has received the topic integration requests instructs the message broker apparatus 4 to generate the integrated topic into which the topics are integrated and generate the message processing unit 47 (FIG. 9) and message queue 37 (FIGS. 4 to 6) associated with such an integrated topic (S61).

Figure 22:
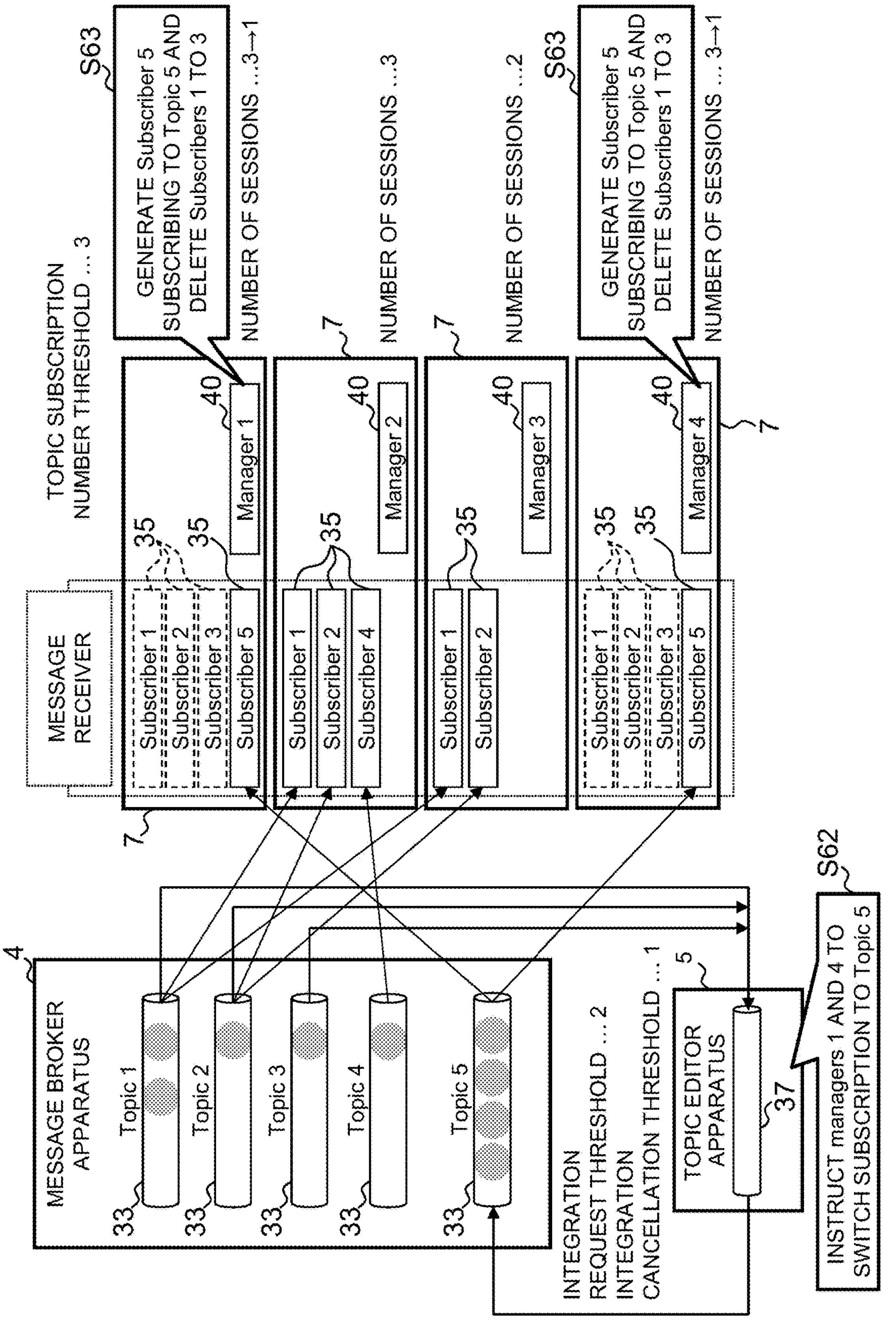
FIG. 22 is a block diagram for describing a specific example of a series of flows performed in the message distribution system on the basis of the topic integration and integration cancellation function of the present embodiment.

As illustrated in FIG. 22, the topic editor apparatus 5 starts the subscription to "Topic 1", "Topic 2", and "Topic 3" and transmits, to the message broker apparatus 4, the acquired messages on "Topic 1", "Topic 2", and "Topic 3". Thus, the messages are stored in the message queue 33 for an integrated topic provided in the message broker apparatus 4 in association with "Topic 5".

Then, the topic editor apparatus 5 integrates "Topic 1", "Topic 2", and "Topic 3" and transmits, to each of "manager 1" and "manager 4", the integration completion notification that the generation of the integrated topic of "Topic 5" has been completed and the subscription switching flag to instruct "manager 1" and "manager 4" to switch the subscription to the topics (S62).

Then, each of "manager 1" and "manager 4" that has received the integration completion notification generates the subscriber 35 of "Subscriber 5" in association with the integrated topic of "Topic 5", and deletes the subscribers 35 of "Subscriber 1" to "Subscriber 3" associated with "Topic 1", "Topic 2", and "Topic 3", respectively (S63). Thus, thereafter, "Subscriber 5" starts the subscription to "Topic 5".

Figure 23:
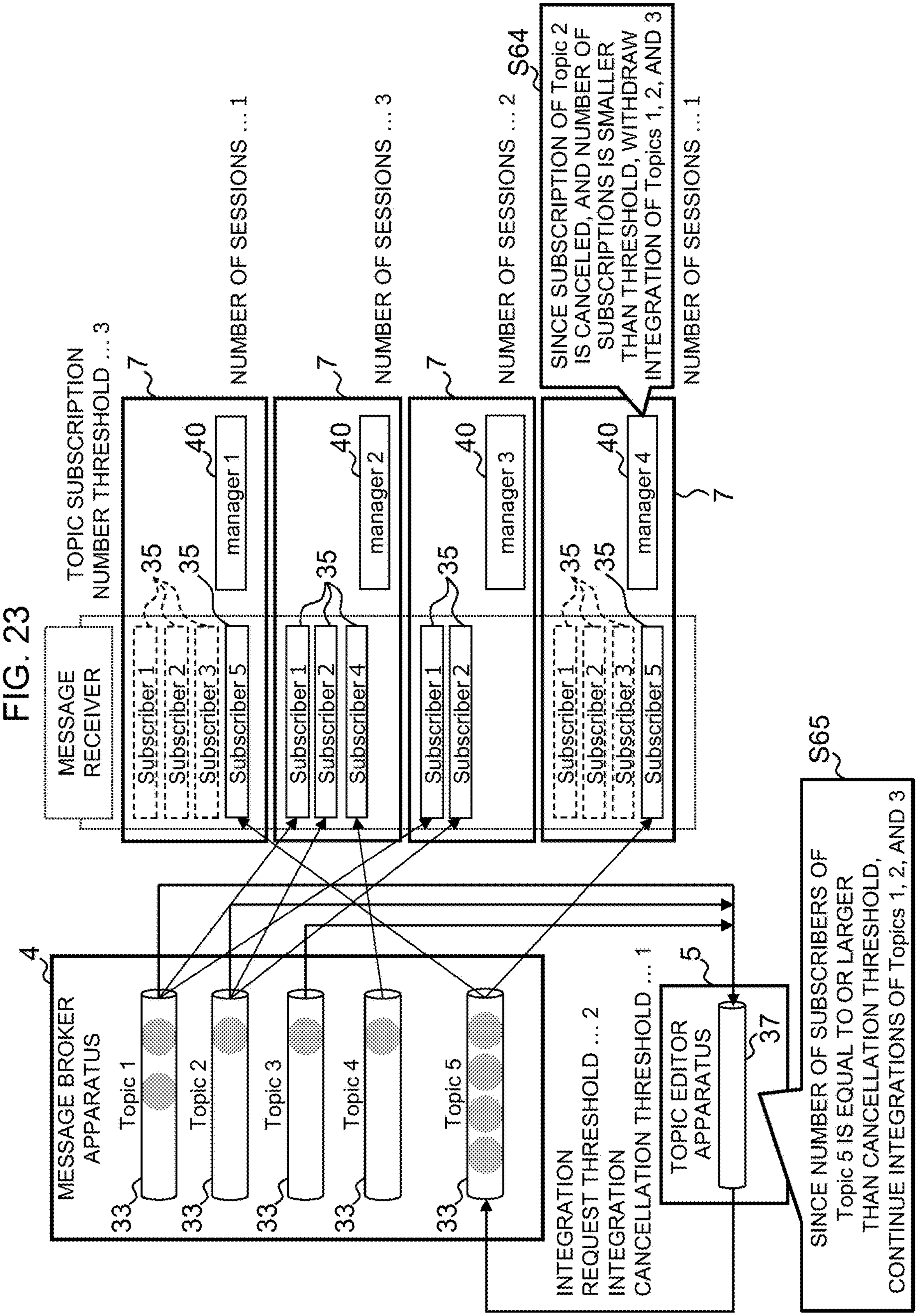
FIG. 23 is a block diagram for describing a specific example of a series of flows performed in the message distribution system on the basis of the topic integration and integration cancellation function of the present embodiment.

On the other hand, thereafter, when a predetermined operation is performed on the message receiving apparatus 7 in which "manager 4" is installed to cancel the subscription to "Topic 2", the number of topics subscribed to by the message receiving apparatus 7 is smaller than the topic subscription number threshold, and therefore, "manager 4" transmits, to the topic editor apparatus 5, the topic integration withdrawal request to withdraw the request to integrate "Topic 1", "Topic 2", and "Topic 3" as illustrated in FIG. 23 (S64).

The topic editor apparatus 5 that has received the topic integration withdrawal request determines whether the number of subscriptions to "Topic 5" after the message receiving apparatus 7 in which "manager 4" is installed terminates the subscription to "Topic 5" is equal to or larger than the integration cancellation threshold. Then, since the number of subscriptions to "Topic 5" after the message receiving apparatus 7 in which "manager 4" is installed terminates the subscription to "Topic 5" is still equal to or larger than the integration cancellation threshold, the topic editor apparatus 5 continues to integrate "Topic 1", "Topic 2", and "Topic 3" as it is. (S65).

Figure 24:
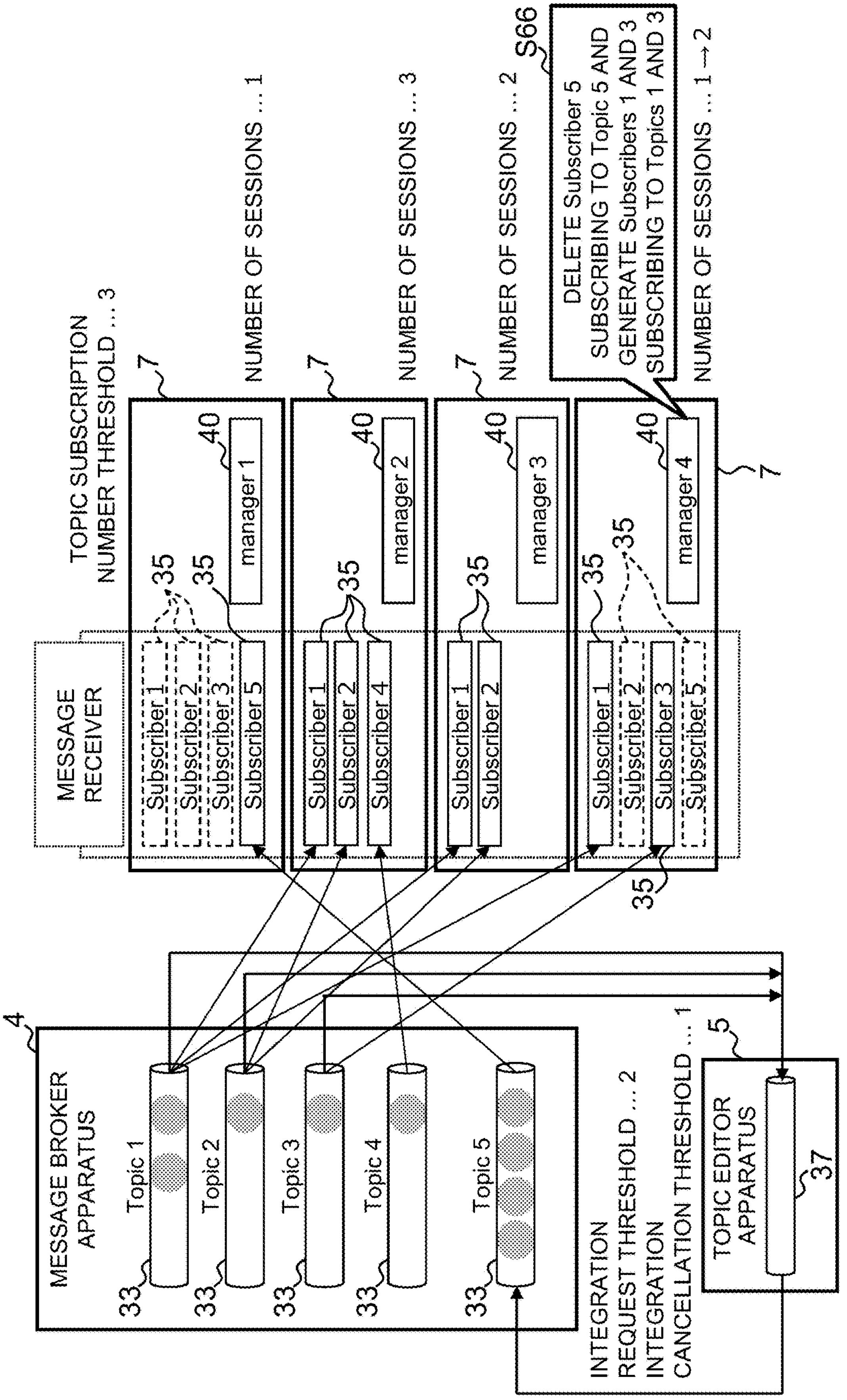
FIG. 24 is a block diagram for describing a specific example of a series of flows performed in the message distribution system on the basis of the topic integration and integration cancellation function of the present embodiment.

On the other hand, as illustrated in FIG. 24, "manager 4" deletes "Subscriber 5" associated with "Topic 5" along with the cancellation of subscription to "Topic 2" and generates the subscribers 35 of "Subscriber 1" and "Subscriber 3" in association with "Topic 1" and "Topic 3", respectively, except for "Topic 2" which is integrated into "Topic 5" (S66).

Figure 25:
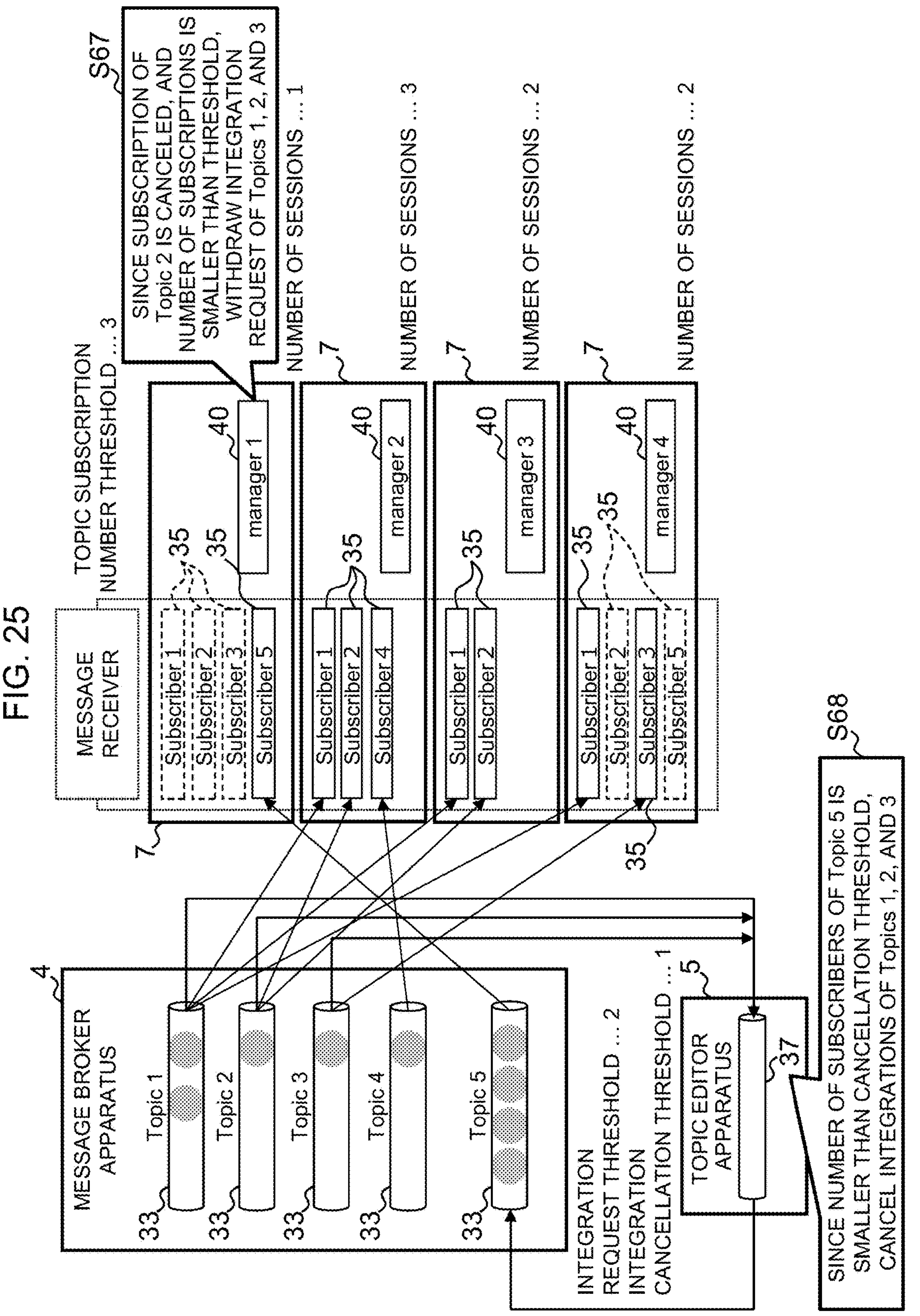
FIG. 25 is a block diagram for describing a specific example of a series of flows performed in the message distribution system on the basis of the topic integration and integration cancellation function of the present embodiment.

Thereafter, when a predetermined operation is performed on the message receiving apparatus 7 in which "manager 1" is installed to cancel the subscription to "Topic 2", the number of topics subscribed to by the message receiving apparatus 7 is smaller than the topic subscription number threshold, and therefore, "manager 1" transmits, to the topic editor apparatus 5, the topic integration withdrawal request to withdraw the request to integrate "Topic 1", "Topic 2", and "Topic 3" as illustrated in FIG. 25 (S67).

The topic editor apparatus 5 that has received the topic integration withdrawal request determines whether the number of subscriptions to "Topic 5" after the message receiving apparatus 7 in which "manager 1" is installed terminates the subscription to "Topic 5" is equal to or larger than the integration cancellation threshold.

Here, the number of subscriptions to "Topic 5" after the message receiving apparatus 7 in which "manager 1" is installed terminates the subscription to "Topic 5" becomes smaller than the integration cancellation threshold. Then, the topic editor apparatus 5 provides an instruction to the message broker apparatus 4 to cancel the integration of "Topic 1", "Topic 2", and "Topic 3", and deletes the message processing unit 47 and the message queue 37 that are created in the topic editor apparatus 5 itself in association with "Topic 5" (S68). This makes it possible to cancel the integration of "Topic 1", "Topic 2", and "Topic 3".

Figure 26:
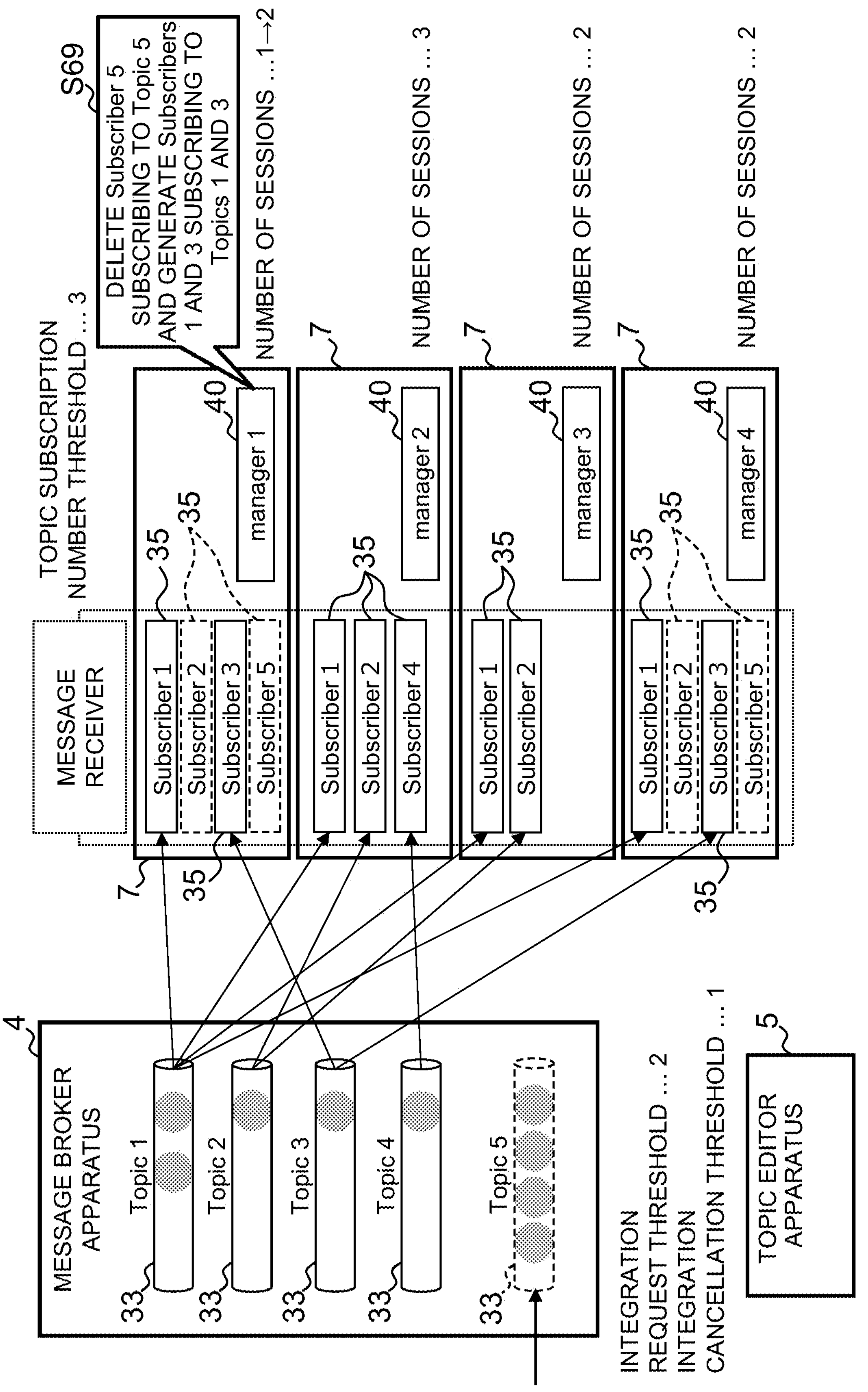
FIG. 26 is a block diagram for describing a specific example of a series of flows performed in the message distribution system on the basis of the topic integration and integration cancellation function of the present embodiment.

When the cancellation of the integration of "Topic 1", "Topic 2", and "Topic 3" is completed, the topic editor apparatus 5 notifies "manager 1" of the fact. Then, as illustrated in FIG. 26, "manager 1" that has received the notification deletes "Subscriber 5" associated with "Topic 5", and generates the subscribers 35 of "Subscriber 1" and "Subscriber 3" in association with "Topic 1" and "Topic 3", respectively, except for "Topic 2" which is integrated into "Topic 5" (S69).

(5) Effects of the Present Embodiment

In the message distribution system 1 of the present embodiment as described above, when the number of subscriptions to topics in the message receiving apparatus 7 is equal to or larger than the topic subscription number threshold, the topics are integrated into one integrated topic, which makes it to possible to prevent the number of sessions between the message broker apparatus 4 and each message receiving apparatus 7 from being equal to or larger than the topic subscription number threshold. Accordingly, the present message distribution system 1 makes it possible to reduce an increase in management cost of the session management due to an increase in the number of subscriptions to topics in the message receiving apparatus 7.

In the present message distribution system 1, the integration and deletion of topics are autonomously performed as described above, which makes it possible to appropriately reduce an increase in management cost of the session management due to an increase in the number of subscriptions to the topics without a manual operation. This makes it possible to construct the message distribution system with low management cost and high reliability.

(6) Other Embodiments

Although in the above-described embodiment, a case where the message sending apparatus 2 is a sending apparatus that transmits, for example, operation data of a manufacturing apparatus installed in a factory and operation data of a construction machine operating at a construction site as messages has been described, the present invention is not limited thereto, and the other various sending apparatuses can be applied as the message sending apparatus 2.

Although in the above-described embodiment, a case where the present invention is applied to the message distribution system 1 constructed as a pull type system in which the message receiving apparatus 7 acquires messages from the message broker apparatus 4 periodically has been described, the present invention is not limited thereto, and the present invention can be also applied to a push-type message distribution system 1 in which the message broker apparatus 4 manages the subscriber 35 that is subscribing to each topic, and when the message is stored in the message queue 33 for any topic, transmits the message to each message receiving apparatus 7 that is subscribing to the topic.

Industrial Applicability

The present invention can be widely applicable to the message distribution systems having various configurations that distribute messages using a Pub/Sub model.

Reference Signs List

1 . . . message distribution system, 2 . . . message sending apparatus, 4 . . . message broker apparatus, 5 . . . topic editor apparatus, 7 . . . message receiving apparatus, 10 . . . publisher, 11, 15, 19 . . . CPU, 33, 37 . . . message queue, 35 . . . subscriber, 36 . . . application, 40 . . . manager, 40A . . . subscription switching instruction function unit, 40B . . . subscription switching function unit, 40C . . . integration request function unit, 41 . . . topic management unit, 42 . . . message distribution unit, 45 . . . subscription condition list, 46 . . . reference topic list, 47 . . . message processing unit, 48 . . . integration management unit, 49 . . . integration request list, 50 . . . integration condition list, 51 . . . change schedule list

The invention claimed is:

1. A message distribution system that individually manages messages transmitted from a sending apparatus for each of topics in a relay apparatus and distributes the messages on the topics subscribed to by a receiving apparatus from the relay apparatus to the receiving apparatus, the message distribution system comprising: a topic editor apparatus that manages the topics, wherein the receiving apparatus transmits, to the topic editor apparatus, an integration request that requests to integrate the topics subscribed to by the receiving apparatus itself when the number of the topics subscribed to by the receiving apparatus itself is equal to or larger than a predetermined first threshold, the topic editor apparatus instructs the relay apparatus to integrate the topics requested to be integrated by the received integration request, starts subscription to the topics requested to be integrated by the integration request, and transmits the received messages to the relay apparatus, while instructing the receiving apparatus that has transmitted the integration request to subscribe to an integrated topic in which the topics requested to be integrated by the integration request are integrated, and the relay apparatus generates the integrated topic into which the specified topics are integrated according to an instruction from the topic editor apparatus, manages the messages on the topics constituting the integrated topic as messages on the integrated topic, and distributes the messages on the integrated topic to the receiving apparatus that subscribes to the integrated topic.

2. The message distribution system according to claim 1, wherein the topic editor apparatus manages the integration request transmitted from each of a plurality of the receiving apparatuses, and when the number of the integration requests having the same contents received is equal to or larger than a second threshold, instructs the relay apparatus to integrate the topics requested to be integrated by the received integration request, and starts subscription to the topics requested to be integrated by the integration request and transmits the received messages to the relay apparatus, while instructing the receiving apparatus that has transmitted the integration request to subscribe to an integrated topic into which the topics requested to be integrated by the integration request are integrated.

3. The message distribution system according to claim 1, wherein the receiving apparatus is provided with a subscriber that receives the messages on the associated topics for each of the topics to be subscribed to, and the receiving apparatus when receiving an instruction to subscribe to the integrated topic from the topic editor apparatus, generates the subscriber associated with the integrated topic and deletes the subscriber associated with each of the topics constituting the integrated topic.

4. The message distribution system according to claim 1, wherein the receiving apparatus when subscription to any of the topics constituting the integrated topic is stopped after the topics subscribed to by the receiving apparatus itself are integrated into the integrated topic, transmits, to the topic editor apparatus, an integration withdrawal request that requests to withdraw the integration request corresponding to the integrated topic, the topic editor apparatus notifies the receiving apparatus that has transmitted the integration withdrawal request of the integration cancellation of the integrated topic in response to the integration withdrawal request, while instructing the relay apparatus to cancel integration of the corresponding integrated topic, stops the subscription to the topics constituting the integrated topic, and furthermore notifies the receiving apparatus that has transmitted the integration withdrawal request having the same contents as the integration withdrawal request up to now that the integration cancellation of the integrated topic has been completed, and the receiving apparatus when receiving notification about the integration cancellation of the integrated topic or notification about completion of the integration cancellation, stops the subscription to the integrated topic, and starts the subscription to the topics that continue to be subscribed to among the topics constituting the integrated topic.

5. The message distribution system according to claim 4, wherein the topic editor apparatus when the number of subscriptions to the integrated topics as a target of the integration withdrawal request is smaller than a predetermined third threshold, instructs the relay apparatus to cancel the corresponding integrated topic, stops the subscription to the topics constituting the integrated topic, and furthermore notifies the receiving apparatus that has transmitted the integration withdrawal request having the same contents as the integration withdrawal request up to now that the integration cancellation of the integrated topic has been completed.

6. The message distribution system according to claim 4, wherein the receiving apparatus when the number of subscriptions to the topics that are subscribed to by the receiving apparatus itself except for the topics for which the subscription is stopped is equal to or larger than the first threshold after transmitting the integration withdrawal request to the topic editor apparatus, transmits, to the topic editor apparatus, the integration request that requests to integrate the topics that continue to be subscribed to.

7. The message distribution system according to claim 4, wherein the receiving apparatus is provided with a subscriber that receives the messages on the associated topics for each of the topics to be subscribed to, and the receiving apparatus when receiving notification about the completion of the integration cancellation of the integrated topic from the topic editor apparatus, deletes the subscriber associated the integrated topic, and generates the subscriber associated with each of the topics that continue to be subscribed to among the topics constituting the integrated topic.

8. A message distribution method executed by a message distribution system that individually manages messages transmitted from a sending apparatus for each of topics in a relay apparatus and distributes the messages on the topics subscribed to by a receiving apparatus from the relay apparatus to the receiving apparatus, the message distribution system comprising:

a topic editor apparatus that manages the topics, the method comprising:

a first step in which the receiving apparatus transmits, to the topic editor apparatus, an integration request that requests to integrate the topics subscribed to by the receiving apparatus itself when the number of the topics subscribed to by the receiving apparatus itself is equal to or larger than a predetermined first threshold;

a second step in which the topic editor apparatus instructs the relay apparatus to integrate the topics requested to be integrated by the received integration request, starts subscription to the topics requested to be integrated by the integration request, and transmits the received messages to the relay apparatus, while instructing the receiving apparatus that has transmitted the integration request to subscribe to an integrated topic in which the topics requested to be integrated by the integration request are integrated; and a third step in which the relay apparatus generates the integrated topic into which the specified topics are integrated according to an instruction from the topic editor apparatus, manages the messages on the topics constituting the integrated topic as messages on the integrated topic, and distributes the messages on the integrated message to the receiving apparatus that subscribes to the integrated topic.

9. The message distribution method according to claim 8, wherein in the second step, the topic editor apparatus manages the integration request transmitted from each of a plurality of the receiving apparatuses, and when the number of the integration requests having the same contents received is equal to or larger than a second threshold, instructs the relay apparatus to integrate the topics requested to be integrated by the received integration request, and starts subscription to the topics requested to be integrated by the integration request and transmits the received messages to the relay apparatus, while instructing the receiving apparatus that has transmitted the integration request to subscribe to an integrated topic into which the topics requested to be integrated by the integration request are integrated.

10. The message distribution method according to claim 8, wherein the receiving apparatus is provided with a subscriber that receives the messages on the associated topics for each of the topics to be subscribed to, and in the second step, the receiving apparatus when receiving an instruction to subscribe to the integrated topic from the topic editor apparatus, generates the subscriber associated with the integrated topic and deletes the subscriber associated with each of the topics constituting the integrated topic.

11. The message distribution method according to claim 8, further comprising:

a fourth step in which the receiving apparatus, when subscription to any of the topics constituting the integrated topic is stopped after the topics subscribed to by the receiving apparatus itself are integrated into the integrated topic, transmits, to the topic editor apparatus, an integration withdrawal request that requests to withdraw the integration request corresponding to the integrated topic;

a fifth step in which the topic editor apparatus notifies the receiving apparatus that has transmitted the integration withdrawal request of the integration cancellation of the integrated topic in response to the integration withdrawal request, while instructing the relay apparatus to cancel integration of the corresponding integrated topic, stops the subscription to the topics constituting the integrated topic, and furthermore notifies the receiving apparatus that has transmitted the integration withdrawal request having the same contents as the integration withdrawal request up to now that the integration cancellation of the integrated topic has been completed; and a sixth step in which the receiving apparatus, when receiving notification about the integration cancellation of the integrated topic or notification about completion of the integration cancellation, stops the subscription to the integrated topic, and starts the subscription to the topics that continue to be subscribed to among the topics constituting the integrated topic.

12. The message distribution method according to claim 11, wherein in the fifth step, the topic editor apparatus when the number of subscriptions to the integrated topics as a target of the integration withdrawal request is smaller than a predetermined third threshold, instructs the relay apparatus to cancel the corresponding integrated topic, stops the subscription to the topics constituting the integrated topic, and furthermore notifies the receiving apparatus that has transmitted the integration withdrawal request having the same contents as the integration withdrawal request up to now that the integration cancellation of the integrated topic has been completed.

13. The message distribution method according to claim 11, wherein the receiving apparatus when the number of subscriptions to the topics that are subscribed to by the receiving apparatus itself except for the topics for which the subscription is stopped is equal to or larger than the first threshold after transmitting the integration withdrawal request to the topic editor apparatus, transmits, to the topic editor apparatus, the integration request that requests to integrate the topics that continue to be subscribed to.

14. The message distribution method according to claim 11, wherein the receiving apparatus is provided with a subscriber that receives the messages on the associated topics for each of the topics to be subscribed to, and in the fifth step, the receiving apparatus when receiving notification about the completion of the integration cancellation of the integrated topic from the topic editor apparatus, deletes the subscriber associated the integrated topic, and generates the subscriber associated with each of the topics that continue to be subscribed to among the topics constituting the integrated topic.

* * * * *